(12) United States Patent
Yoshimura et al.

(10) Patent No.: US 10,474,403 B2
(45) Date of Patent: Nov. 12, 2019

(54) PROCESSING APPARATUS AND SYSTEM FOR CHARGING SENDER OF DATA

(71) Applicant: FUJI XEROX CO., LTD., Tokyo (JP)

(72) Inventors: Koichi Yoshimura, Kanagawa (JP); Shigeru Yoneda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/602,426

(22) Filed: May 23, 2017

(65) Prior Publication Data

US 2018/0018137 A1   Jan. 18, 2018

(30) Foreign Application Priority Data

Jul. 13, 2016 (JP) .................................. 2016-138866

(51) Int. Cl.
*G06F 3/12* (2006.01)
*G06Q 20/10* (2012.01)
*H04N 1/00* (2006.01)
*G06Q 20/04* (2012.01)
*G06Q 10/10* (2012.01)

(52) U.S. Cl.
CPC .......... *G06F 3/1236* (2013.01); *G06F 3/1203* (2013.01); *G06F 3/1268* (2013.01); *G06F 3/1286* (2013.01); *G06F 3/1288* (2013.01); *G06Q 20/045* (2013.01); *G06Q 20/10* (2013.01); *H04N 1/00244* (2013.01); *H04N 1/00411* (2013.01); *H04N 1/00795* (2013.01); *G06F 3/1271* (2013.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 2007/0124242 A1* | 5/2007 | Reis, Jr. | ................. | G06Q 20/10 705/39 |
| 2012/0095873 A1* | 4/2012 | Narang | .............. | G06Q 30/0613 705/26.41 |
| 2012/0120448 A1* | 5/2012 | Komaba | ............ | H04N 1/00222 358/1.15 |
| 2012/0287469 A1* | 11/2012 | Tomiyasu | .......... | H04N 1/00244 358/1.15 |
| 2015/0036181 A1* | 2/2015 | Fujinaga | ................ | G06F 3/1292 358/1.15 |
| 2015/0193673 A1* | 7/2015 | Park | ...................... | G06F 3/1213 358/1.15 |
| 2016/0191726 A1* | 6/2016 | Yanase | ............... | H04N 1/00244 358/1.15 |

FOREIGN PATENT DOCUMENTS

JP   2003-173365 A   6/2003

* cited by examiner

*Primary Examiner* — Henok Shiferaw
(74) *Attorney, Agent, or Firm* — Oliff PLC

(57) ABSTRACT

A processing apparatus includes a receiving section that receives data transmitted by a sender, an output section that outputs the data received by the receiving section, and a charge section that charges the sender if the output section outputs the data within a predetermined period after the time at which the data is transmitted.

12 Claims, 23 Drawing Sheets

PROCESSING APPARATUS AND SYSTEM FOR CHARGING SENDER OF DATA

CROSS-REFERENCE TO RELATED APPLICATIONS

This application is based on and claims priority under 35 USC 119 from Japanese Patent Application No. 2016-138866 filed Jul. 13, 2016.

BACKGROUND

Technical Field

The present invention relates to a processing apparatus and a system.

Summary

According to an aspect of the invention, there is provided a processing apparatus including a receiving section that receives data transmitted by a sender, an output section that outputs the data received by the receiving section, and a charge section that charges the sender if the output section outputs the data within a predetermined period after the time at which the data is transmitted.

BRIEF DESCRIPTION OF THE DRAWINGS

Exemplary embodiments of the present invention will be described in detail based on the following figures, wherein.

DETAILED DESCRIPTION

Hereinafter, exemplary embodiments will be described in detail with reference to the attached drawings.

First Exemplary Embodiment

Figure 1:
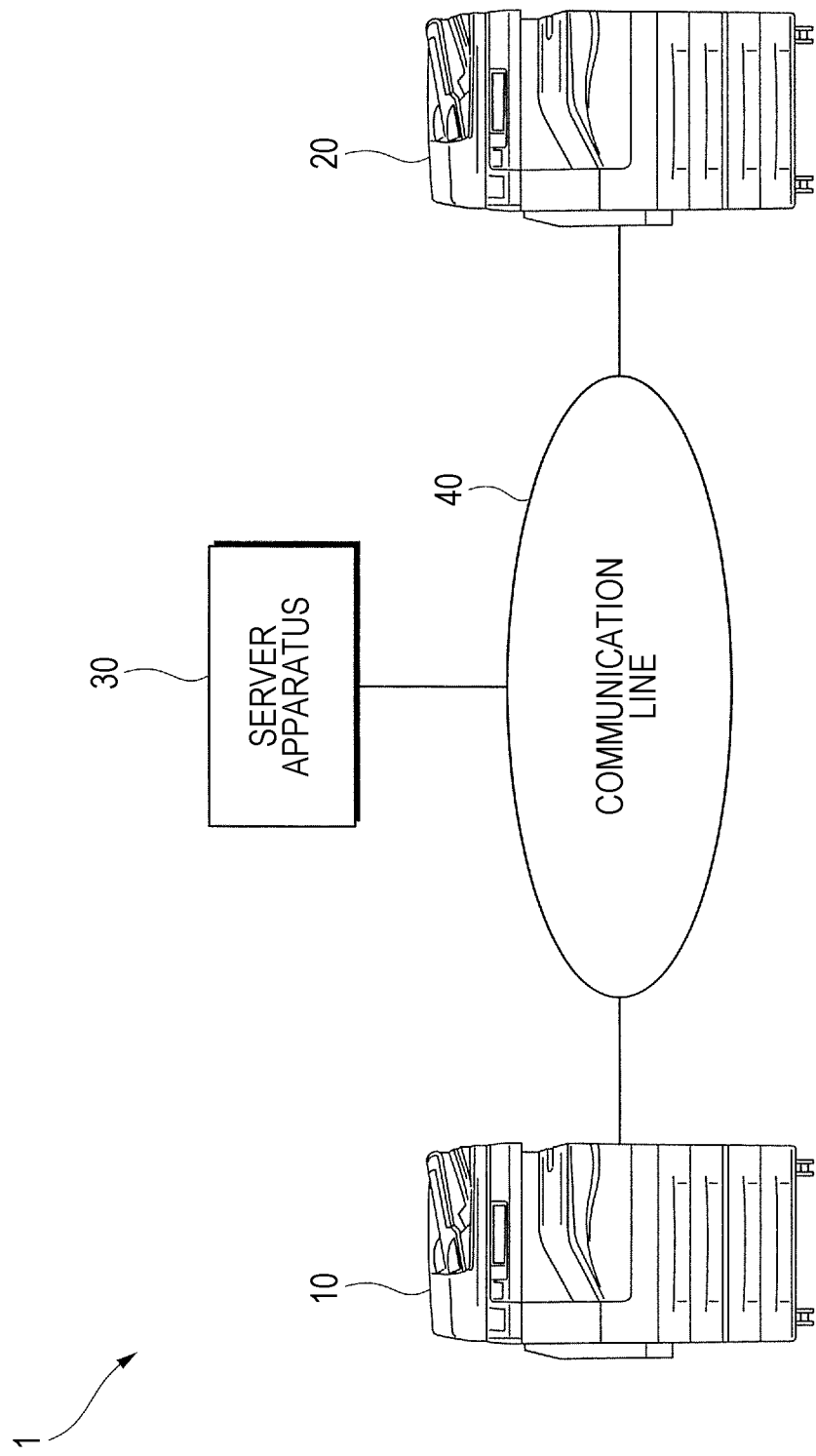
FIG. 1 illustrates a schematic configuration of a system according to a first exemplary embodiment.

FIG. 1 illustrates a schematic configuration of a system 1 according to a first exemplary embodiment of the present invention.

The system 1 includes a first image forming apparatus 10 and a second image forming apparatus 20 that each have the function of copying a document, the function of generating image data of a document that has been read, and the function of forming an image represented by image data on a recording medium such as paper.

The system 1 includes a server apparatus 30 that provides a service upon request from each of the first image forming apparatus 10 and the second image forming apparatus 20.

The first image forming apparatus 10, the second image forming apparatus 20, and the server apparatus 30 are connected to a communication line 40 that connects the first image forming apparatus 10, the second image forming apparatus 20, and the server apparatus 30 to each other in a way that allows their communication. The first image forming apparatus 10, the second image forming apparatus 20, and the server apparatus 30 are capable of communicating with each other via the communication line 40.

As for the term "recording medium" as used herein, such a recording medium may be made of any material as long as the medium allows an image to be formed thereon. Although typically represented by paper, such a material may be an OHP sheet or metal sheet.

Figure 2:
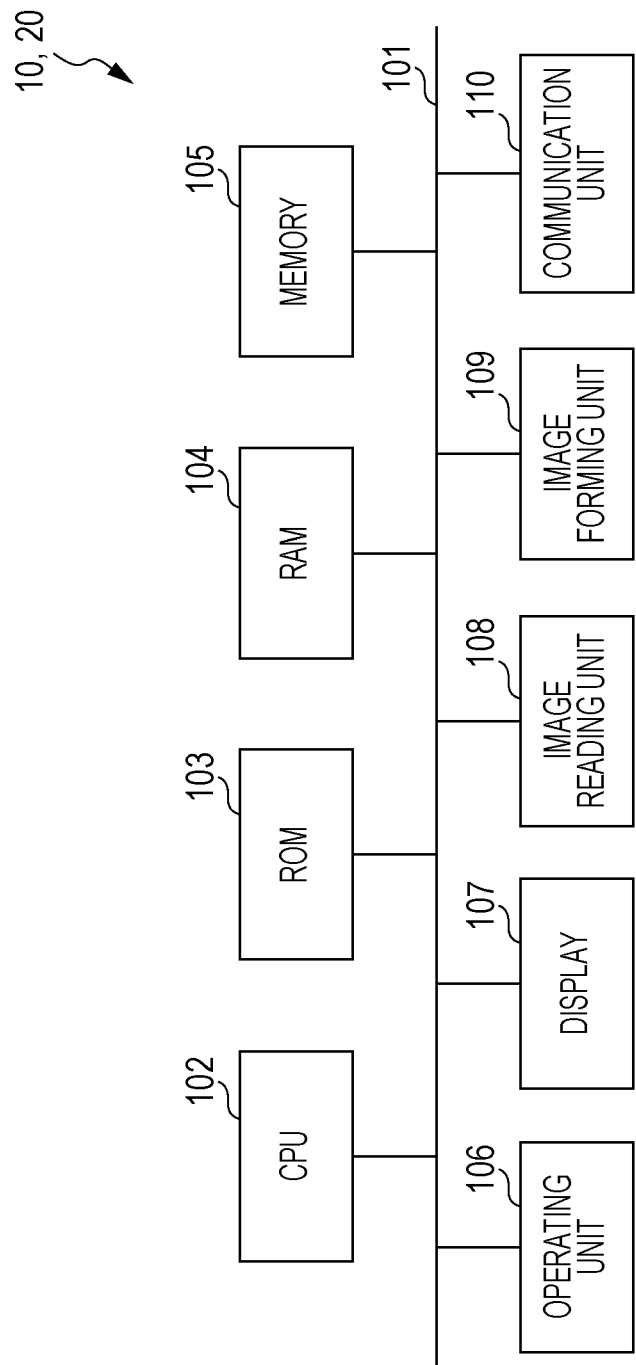
FIG. 2 is a block diagram illustrating the hardware configuration of each of a first image forming apparatus and a second image forming apparatus according to the first exemplary embodiment.

FIG. 2 is a block diagram illustrating the hardware configuration of each of the first image forming apparatus 10 and the second image forming apparatus 20 according to the first exemplary embodiment.

The first image forming apparatus 10 and the second image forming apparatus 20 each include a central processing unit (CPU) 102, a read only memory (ROM) 103, a random access memory (RAM) 104, and a memory 105. The first image forming apparatus 10 and the second image forming apparatus 20 also each include the following components connected to a bus 101: an operating unit 106, a display 107, an image reading unit 108, an image forming unit 109, and a communication unit 110.

The ROM 103 stores a control program executed by the CPU 102. The CPU 102 reads the control program stored in the ROM 103, and executes the control program with the RAM 104 used as a work area. As the control program is executed by the CPU 102, various units of the first image forming apparatus 10 and the second image forming apparatus 20 are controlled by the CPU 102. This allows each of the first image forming apparatus 10 and the second image forming apparatus 20 to, for example, form and output an image onto a recording medium, read a document to generate image data of the document, or communicate with another apparatus via the communication line 40.

The memory 105 includes a storage device to store, for example, data received by the communication unit 110, or data generated by the first image forming apparatus 10 or the second image forming apparatus 20.

The operating unit 106 includes multiple operating sections for receiving user operations. Each operating section may be a hardware key, or may be implemented by a touch panel that is displayed on the display 107 and outputs a control signal according to the location being pressed.

The display 107 is, for example, a display device having a liquid crystal display. The display 107 displays, under control by the CPU 102, information such as a menu screen for operating the first image forming apparatus 10 or the second image forming apparatus 20, or data related to the first image forming apparatus 10 or the second image forming apparatus 20.

The image reading unit 108 includes the following components: platen glass (not illustrated), a light irradiating unit (not illustrated) that irradiates the target reading surface (image surface) of a document with light, a light guide unit (not illustrated) that guides reflected light, which is light applied from the light irradiating unit to the target reading surface of the document and reflected by the target reading surface of the document, and an imaging lens (not illustrated) that forms an optical image of the light guided by the light guide unit. The image reading unit 108 also includes a detector (not illustrated) and an image processing unit (not illustrated). The detector, which is implemented by a photoelectric conversion element such as a charge coupled device (CCD) image sensor that performs photoelectric conversion of light formed by the imaging lens, detects an optical image that has been formed. An electrical signal obtained by the detector is transmitted to the image processing unit.

The image reading unit 108 reads an image of a document transported by a document transport unit, and an image of a document placed on the platen glass.

The image forming unit 109 includes four image forming units (not illustrated) corresponding to yellow, magenta, cyan, and black, which are arranged in parallel at predetermined intervals. Each image forming unit has a photoconductor drum (not illustrated), a charger (not illustrated) that uniformly charges the surface of the photoconductor drum, a developing unit (not illustrated) that develops an image with toner to form a visible image, and a toner cartridge (not illustrated) used to supply toner of the corresponding color to the developing unit.

The image forming unit 109 also includes an optical system unit (not illustrated) that irradiates the photoconductor drum with laser light, and an intermediate transfer unit (not illustrated) that causes toner images of various colors formed on the photoconductor drum to be multiply transferred onto an intermediate transfer belt (not illustrated). Further, the image forming unit 109 includes a second transfer unit (not illustrated) that transfers, to the recording medium, toner images formed in a superimposed manner on the intermediate transfer unit, and a fixing device (not illustrated) that applies heat and pressure to a toner image formed on the recording medium to fix the toner image onto the recording medium.

The communication unit 110 is connected to the communication line 40, and functions as a communication interface (communication I/F) that communicates with another apparatus connected to the communication line 40.

Figure 3:
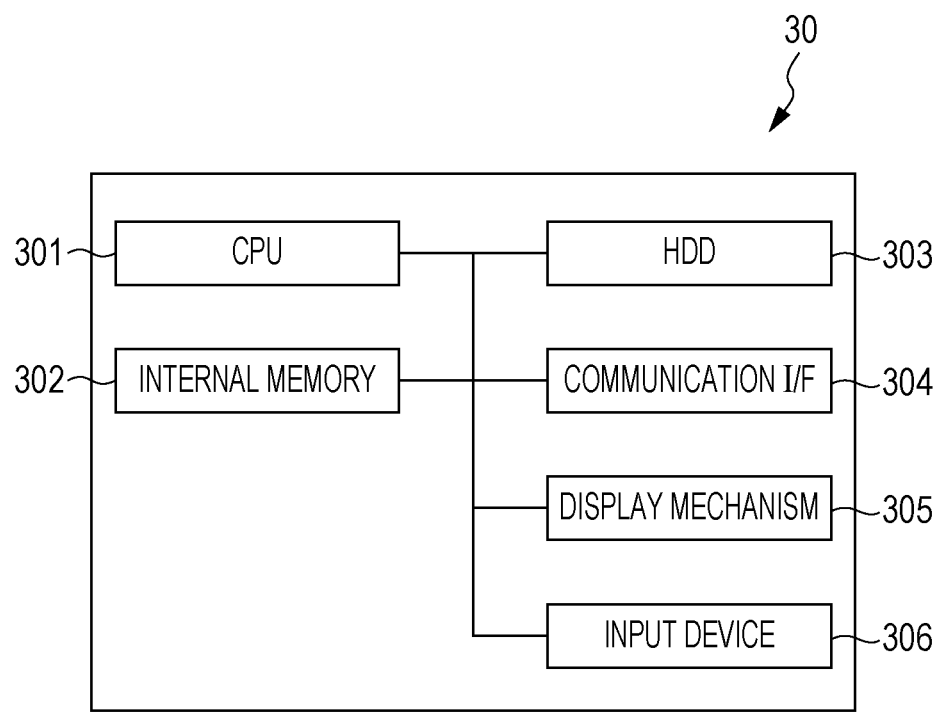
FIG. 3 is a block diagram illustrating the hardware configuration of a server apparatus according to the first exemplary embodiment.

FIG. 3 is a block diagram illustrating the hardware configuration of the server apparatus 30 according to the first exemplary embodiment.

As illustrated in FIG. 3, the server apparatus 30 includes a CPU 301, an internal memory 302, and a hard disk drive (HDD) 303. The CPU 301 executes various software such as an operating system (OS) or applications. The internal memory 302 is a storage area for storing various software, data used for execution of such software, and other information. The HDD 303 is a storage area for storing data input to various software, data output from various software, and other information.

The server apparatus 30 includes a communication interface (to be referred to as "communication I/F" hereinafter) 304 for communicating with the external, a display mechanism 305 implemented by a video memory or a display, and an input device 306 such as a keyboard or a mouse.

The program executed by the CPU 301 may be provided while being stored on a computer readable recording medium such as a magnetic recording medium (e.g., a magnetic tape or a magnetic disk), an optical recording medium (e.g., an optical disc), a magneto-optical recording medium, or a semiconductor memory. Alternatively, the program may be downloaded to the server apparatus 30 via communication using the Internet.

The server apparatus 30 according to the first exemplary embodiment is a cloud print server. That is, the server apparatus 30 provides a cloud service (to be referred to as "cloud print service" hereinafter) that allows a document to be printed on the first image forming apparatus 10 or the second image forming apparatus 20 that is disposed in homes, offices, public places, or other locations. Specifically, the server apparatus 30 generates print instruction information, which instructs a document to be printed on one of the first image forming apparatus 10 and the second image forming apparatus 20, upon request from the other image forming apparatus, and stores the generated print instruction information until an inquiry as to whether print instruction information exists is made from the other image forming apparatus. Then, when an inquiry as to whether print instruction information exists is made from one of the image forming apparatuses, the server apparatus 30 generates document data in a format that allows the document data to be processed by the one image forming apparatus, and provides the generated document data to the one image forming apparatus. Provision of document data to one of the image forming apparatuses is performed by transmission of print instruction information including the document data to the one image forming apparatus. As used hereinafter, the term "print instruction information" is taken to also include the document data to be printed.

It is assumed that the first image forming apparatus 10 and the second image forming apparatus 20 are made ready to receive print instruction information from the cloud print service. Specifically, this involves registering the first image forming apparatus 10 and the second image forming apparatus 20 for the cloud print service, and setting information related to the cloud print service for the first image forming apparatus 10 and the second image forming apparatus 20 in advance.

In the following description, a print job represents a unit of processing executed by each of the first image forming apparatus 10 and the second image forming apparatus 20 based on print instruction information instructing that print data be printed. In some cases, print instruction information will be herein referred to as print job.

Further, the source electronic data from which to generate an image recorded onto a recording medium will be herein referred to as "document data". The term "document data" does not mean only electronized data of a "document" including text. Examples of data herein referred to as "document data" include image data of a picture, a photograph, a graphic form, and so on (regardless of whether the data is raster or vector), data recorded in software such as database management software or spreadsheet software, and other printable electronic data.

Figure 4:
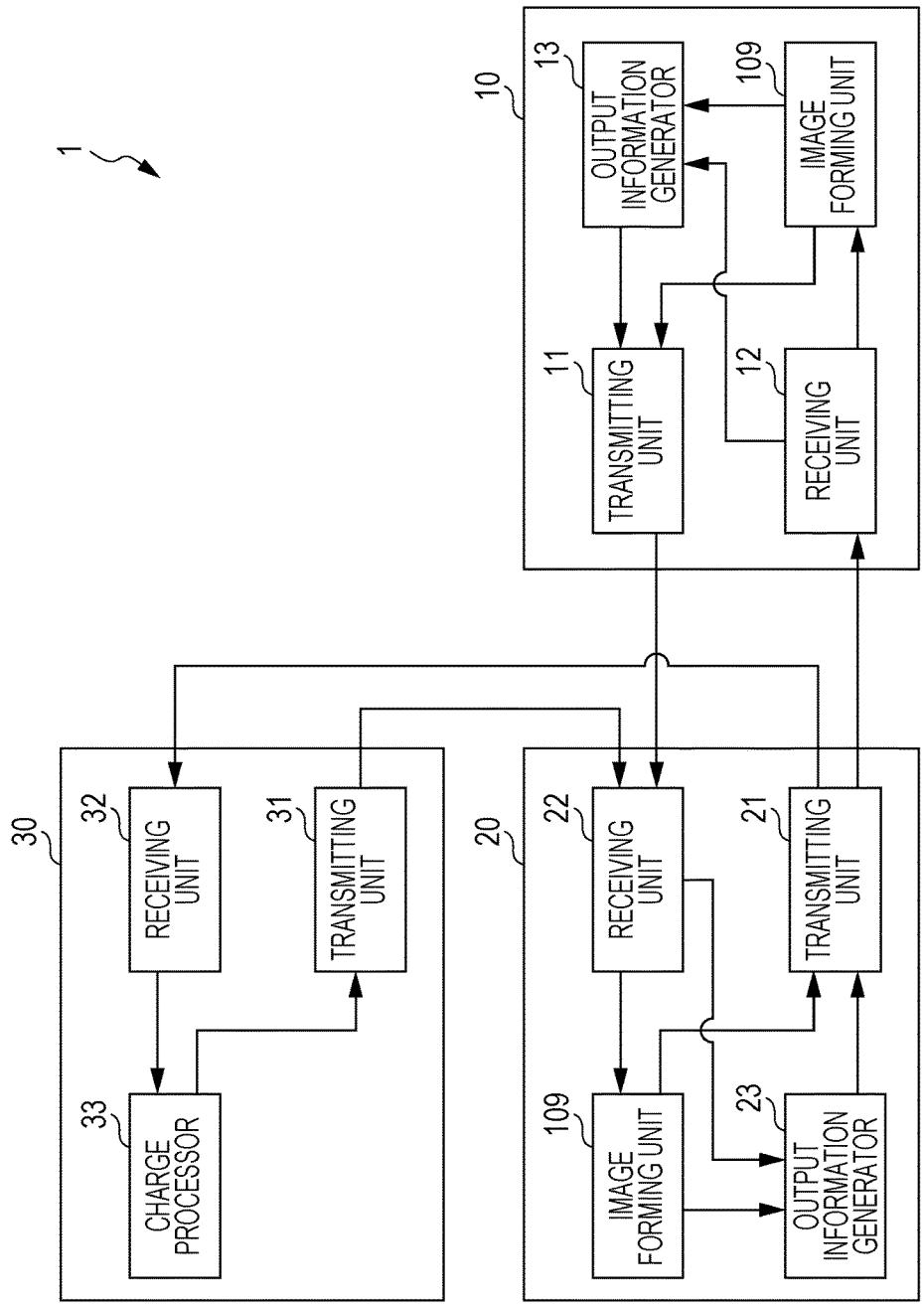
FIG. 4 is a block diagram illustrating the functional configuration of each of the first image forming apparatus, the second image forming apparatus, and the server apparatus according to the first exemplary embodiment.

FIG. 4 is a block diagram illustrating the functional configuration of each of the first image forming apparatus 10, the second image forming apparatus 20, and the server apparatus 30 according to the first exemplary embodiment.

As illustrated in FIG. 4, the first image forming apparatus 10 and the second image forming apparatus 20 respectively include transmitting units 11 and 21 that transmit information to the server apparatus 30, and receiving units 12 and 22 that receive information such as a response from the server apparatus 30 to the information transmitted by the transmitting units 11 and 21. The first image forming apparatus 10 and the second image forming apparatus 20 also respectively include output information generators 13 and 23 that generate output information, which represents information about an output made by the image forming unit 109 by forming (printing) an image of document data on a recording medium.

As illustrated in FIG. 4, the server apparatus 30 includes a transmitting unit 31 that transmits information such as document data to the second image forming apparatus 20, and a receiving unit 32 that receives information such as a response from the second image forming apparatus 20 to the information transmitted by the transmitting unit 21. The server apparatus 30 also includes a charge processor 33 that performs a charging process described later.

The server apparatus 30 is a processing apparatus including the receiving unit 32, which is an example of a receiving section that receives data transmitted by the sender, the transmitting unit 31, which is an example of an output section that outputs the data received by the receiving unit 32, and the charge processor 33, which is an example of a charge section that charges the sender if the transmitting unit 31 outputs the data within a predetermined period after the time at which the data is transmitted.

Further, the system 1 according to the first exemplary embodiment is a system including the first image forming apparatus 10, which is an example of a first processing apparatus that transmits data, the second image forming apparatus 20, which is an example of a second processing apparatus that receives and outputs the transmitted data, and the charge processor 33, which is an example of a charge section that charges the sender of the data when the data is transmitted.

The system 1 mentioned above is used to transmit a letter, which is an example of a document. A letter refers to a document that indicates the sender's intent to a specific addressee, or notifies a specific addressee of a fact. Examples of letters include invoices, notifications of convocation, permits, certificates, and direct mails. Invoices include a statement of delivery, a receipt, an estimate sheet, a written application, an application form, and a contract document. Notifications of convocation include an invitation to an event such as a wedding, and a document such as a business report. Permits include a license, a certification, and a testimonial. Certificates include a seal registration certificate, a tax payment certificate, a copy of a family register, and a copy of a residence certificate (an original of a residence certificate or an original of a family register is managed in a government office, and what is issued from a government office is a copy of a residence certificate or a copy of a family register). Examples of direct mails include a document with the addressee written in the document itself.

The system 1 according to the first exemplary embodiment has the following function. That is, when a person (document sender) transmits a letter, in particular, a document that is to be acquired within a predetermined period of time (to be referred to as "express delivery document" hereinafter) by a person who receives the document (document recipient), the system 1 charges the document sender. An example of an express delivery document is a direct mail. For example, such an express delivery document may be a direct mail including a coupon that offers some benefit to the document recipient (e.g., a discount coupon) and has an expiration date.

Figure 5:
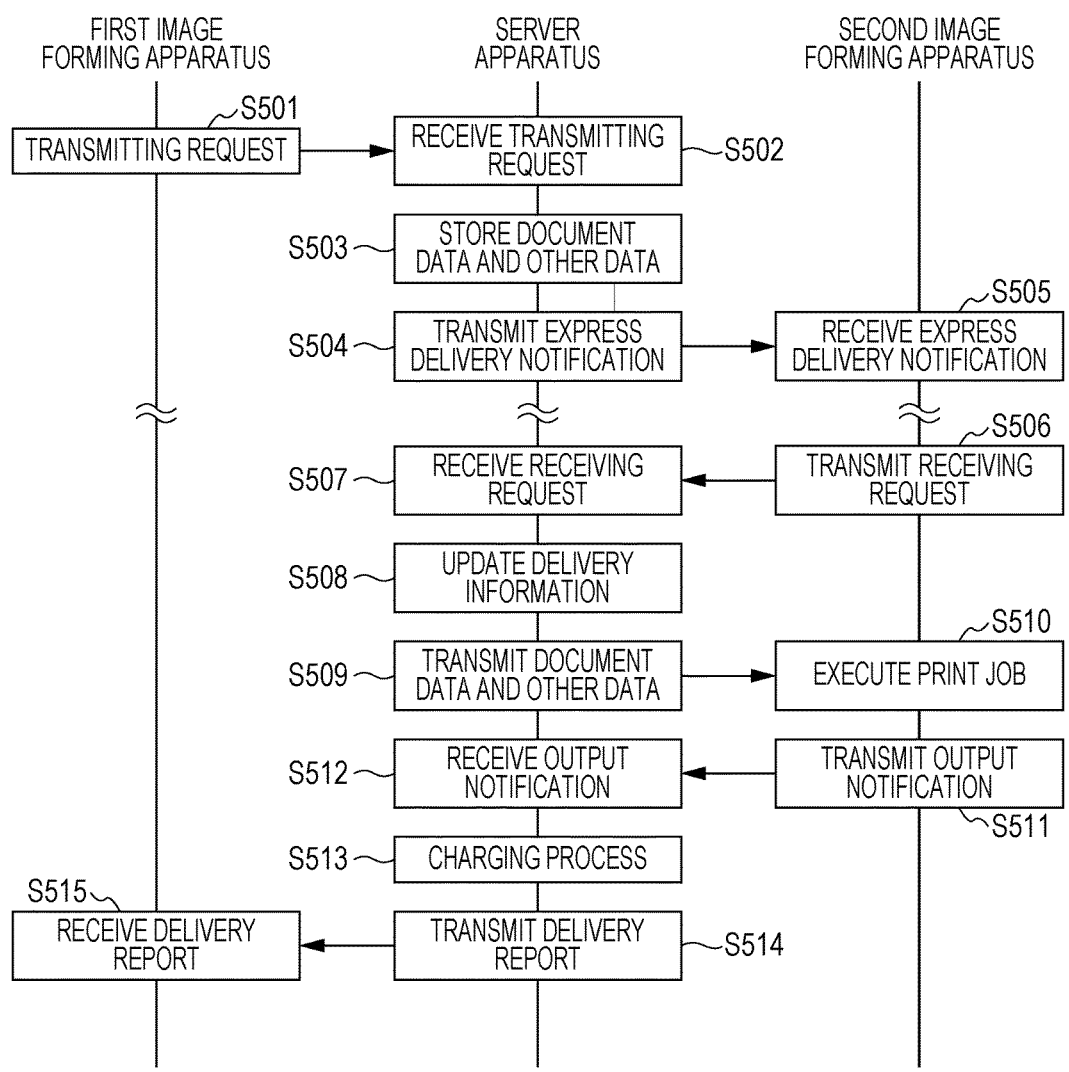
FIG. 5 is a sequence diagram illustrating an example of operation in the system according to the first exemplary embodiment.

FIG. 5 is a sequence diagram illustrating an example of operation in the system 1 according to the first exemplary embodiment. FIG. 5 illustrates an example of operation when the document sender sends, via the first image forming apparatus 10, an express delivery document to the document recipient who uses the second image forming apparatus 20.

Figure 6:
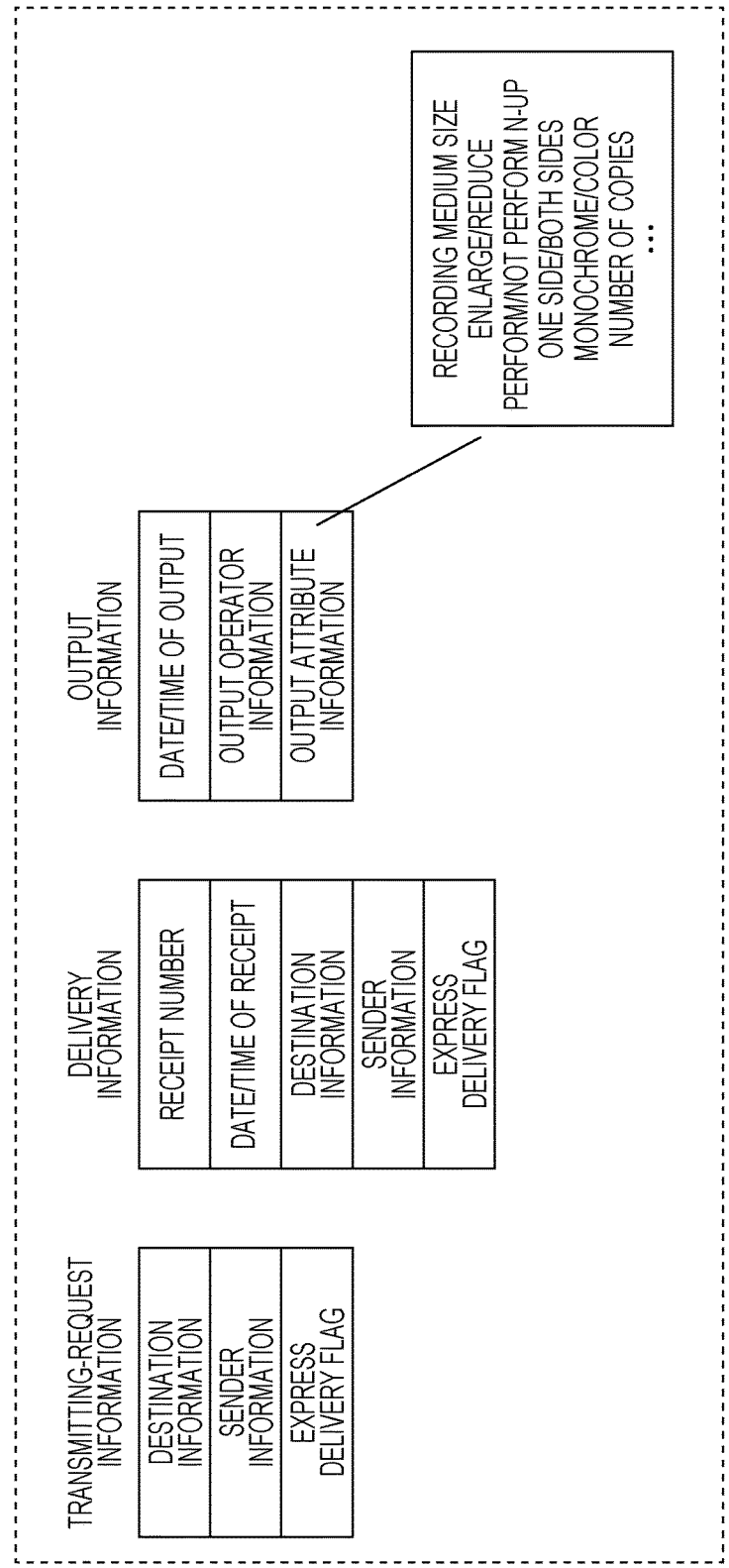
FIG. 6 illustrates information included in each of transmitting-request information, delivery information, and output information.

FIG. 6 illustrates information included in transmitting-request information, delivery information, and output information.

In response to an instruction to transmit given from the document sender, the first image forming apparatus 10 makes a transmitting request by transmitting, to the server apparatus 30, document data and transmitting-request information that are to be transmitted to the second image forming apparatus 20 (S501). The transmitting-request information includes destination information, sender information, and an express delivery flag as illustrated in FIG. 6. An express delivery flag represents information indicating whether the document in question is a document to be acquired by the document recipient within a predetermined period. For example, the transmitting-request information includes an express delivery flag if the document in question is a document to be acquired by the document recipient within a predetermined period. The predetermined period may be determined with reference to the time at which the document sender gives an instruction to transmit, or may be determined with reference to the time at which the first image forming apparatus 10 transmits document data and transmitting-request information to the server apparatus 30. The predetermined period may be set by the first image forming apparatus 10, or may be set by the document sender when the document sender gives an instruction to transmit.

The server apparatus 30 receives the transmitting request transmitted from the first image forming apparatus 10 (S502), and then stores the received document data and delivery information (S503). The delivery information includes a receipt number, the date/time of receipt, destination information, sender information, and an express delivery flag as illustrated in FIG. 6. Then, the server apparatus 30 transmits an express delivery notification, which notifies the arrival of an express delivery document, to the second image forming apparatus 20 (S504). The second image forming apparatus 20 receives the express delivery notification from the server apparatus 30 (S505). The second image forming apparatus 20 informs the document recipient that a document has been sent. Examples of a method for informing the document recipient at this time include displaying information to that effect on the display 107, and sending an e-mail to the document recipient. Alternatively, the server apparatus 30 may send an e-mail to the document recipient to inform that a document has been sent.

In response to a receiving request from the document recipient, the second image forming apparatus 20 transmits a receiving request to the server apparatus 30 (S506). Then, the server apparatus 30 receives the receiving request (S507) and, based on delivery information, the server apparatus 30 searches for the document data for which the receiving request has been made. At this time, the server apparatus 30 updates the delivery information if the document data for which the receiving request has been made exists (S508). At this time, the server apparatus 30 stores, as part of delivery information, information indicating that a receiving request has been made. Thereafter, the server apparatus 30 transmits, to the second image forming apparatus 20, the document data and the delivery information received from the first image forming apparatus 10 (S509).

The second image forming apparatus 20 executes a print job (S510). That is, the second image forming apparatus 20 forms (prints) an image of the document data on a recording medium. Then, the second image forming apparatus 20 transmits, to the server apparatus 30, a notification (output notification) indicating that an image has been formed (printed) and output, together with output information (S511). The output information includes a receipt number, the date/time of output, output operator information, and output attribute information as illustrated in FIG. 6. The output attribute information includes information such as recording medium size, whether to enlarge or reduce, whether to fit multiple pages on a single sheet (whether to perform N-up printing), whether to print on one side or both sides, whether to print monochrome or color, and the number of copies to be printed.

The server apparatus 30 receives the output notification from the second image forming apparatus 20 (S512), and performs a charging process (S513). Then, the server apparatus 30 transmits, to the first image forming apparatus 10, a delivery report indicating that the document has been sent (S514), and the first image forming apparatus 10 receives the delivery report (S515).

In the charging process performed by the server apparatus 30, the charge processor 33 charges the document sender a charge related to delivery of a document, based on output information received by the receiving unit 22. Examples of the method for collecting the charge include withdrawal of the charge at a later date from a registered account registered by the document sender, and credit card payment.

The charge processor 33 may perform a charging process if an express delivery document is output within a predetermined period. The charge processor 33 may, if an express delivery document is output within a predetermined period, charge the document sender higher than if the express delivery document is output past the predetermined period. For example, the charge processor 33 may charge a regular charge if an express delivery document is output past a predetermined period, and charge an express delivery charge if the express delivery document is output within the predetermined period.

Transmitting-Request Receiving Process Performed by Server Apparatus 30

Figure 7:
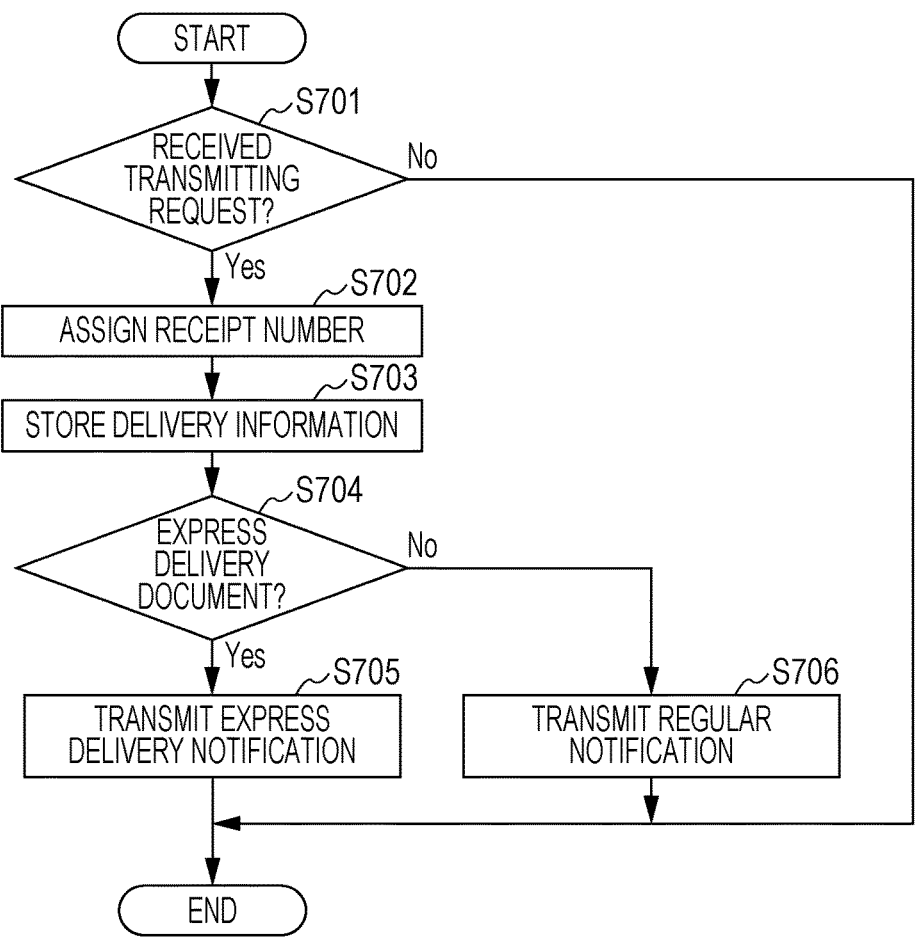
FIG. 7 is a flowchart illustrating a transmitting-request receiving process performed by the server apparatus.

FIG. 7 is a flowchart illustrating a transmitting-request receiving process performed by the server apparatus 30.

The server apparatus 30 repeatedly executes the transmitting-request receiving process every predetermined interval of time (e.g., 10 milliseconds).

The server apparatus 30 determines whether a transmitting request has been received from the first image forming apparatus 10 (S701). If a transmitting request has been received (Yes at S701), the server apparatus 30 assigns a receipt number (S702). The server apparatus 30 then stores delivery information (S703). Thereafter, the server apparatus 30 determines whether the document for which the transmitting request has been received is an express delivery document (S704). This is determined by determining whether the transmitting-request information contains an express delivery flag. If the document in question is an express delivery document (Yes at S704), the server apparatus 30 transmits, to the second image forming apparatus 20, an express delivery notification indicating that an express delivery document has been transmitted (S705). If the document is not an express delivery document (No at S704), the server apparatus 30 transmits, to the second image forming apparatus 20, a regular notification indicating that a regular document, which is not an express delivery document, has been transmitted (S706).

Receiving-Request Receiving Process Performed by Server Apparatus 30

Figure 8:
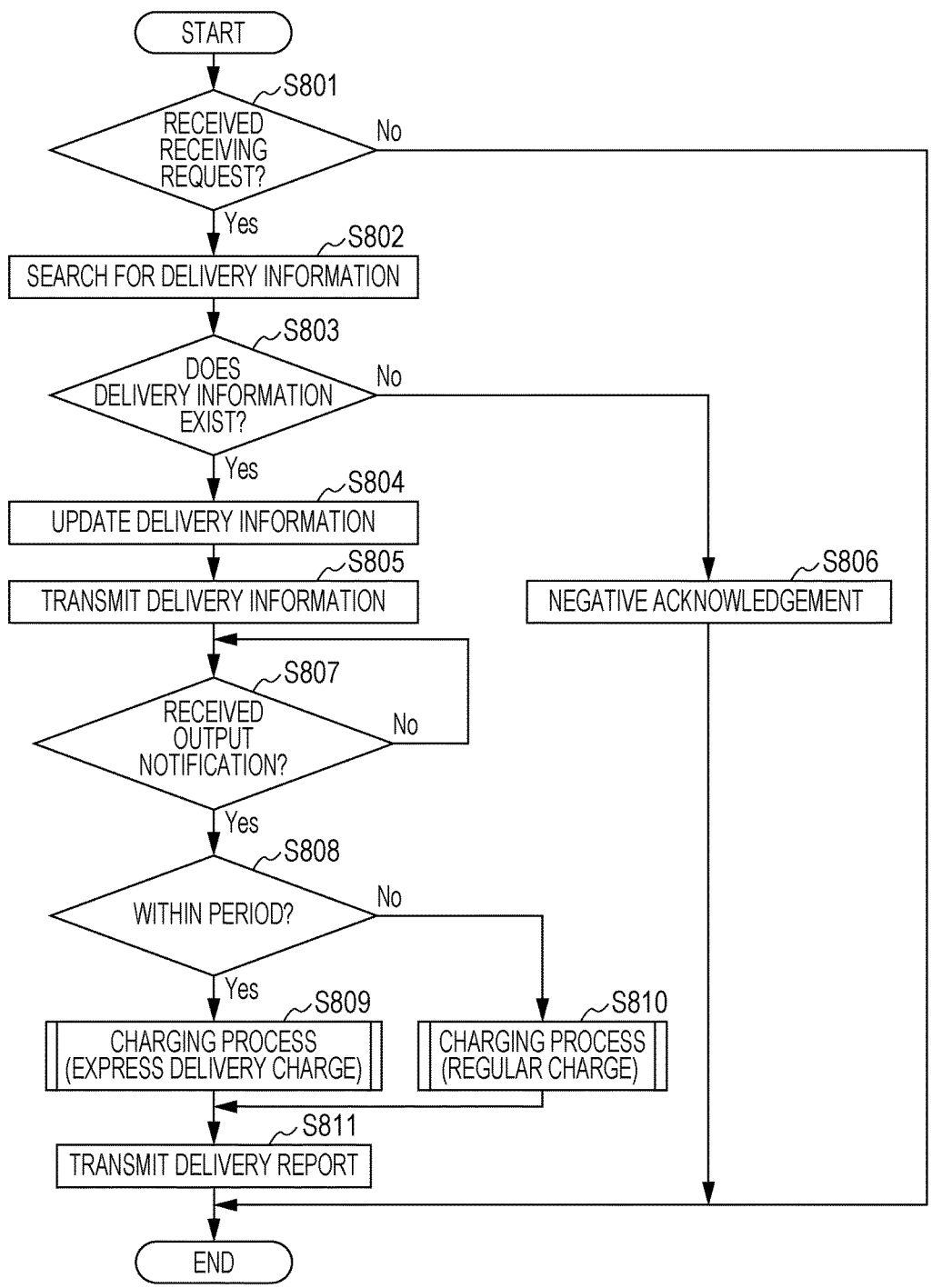
FIG. 8 is a flowchart illustrating a receiving-request receiving process performed by the server apparatus.

FIG. 8 is a flowchart illustrating a receiving-request receiving process performed by the server apparatus 30.

The server apparatus 30 repeatedly executes the receiving-request receiving process every predetermined interval of time (e.g., 10 milliseconds).

The server apparatus 30 determines whether a receiving request has been received (S801). If a receiving request has been received (Yes at S801), the server apparatus 30 searches for delivery information (S802) to determine whether delivery information exists (S803). If delivery information exists (Yes at S803), the server apparatus 30 updates the delivery information (S804), and transmits the delivery information together with the document data for which the receiving request has been made (S805). If delivery information does not exist (No at S803), the server apparatus 30 provides a negative acknowledgement indicating that the document data for which the receiving request has been made does not exist (S806).

After transmitting, at S805, the delivery information together with the document data for which the receiving request has been made, the server apparatus 30 determines whether an output notification has been received (S807). If an output notification has been received (Yes at S807), the server apparatus 30 determines whether the current time is within a predetermined period (S808). Then, if the current time is within a predetermined period (Yes at S808), the server apparatus 30 performs a charging process based on an express delivery charge (S809), and if the current time is not within a predetermined period (No at S808), the server apparatus 30 performs a charging process based on a regular charge (S810).

Thereafter, the server apparatus 30 transmits a delivery report to the first image forming apparatus 10 (S811).

In the first exemplary embodiment mentioned above, the charge processor 33 of the server apparatus 30 may charge the document recipient differently according to the predetermined period within which the document recipient is to acquire an express delivery document. For example, the period may have multiple levels, with a different amount charged for each level.

The date/time by which the document recipient is to acquire an express delivery document may be set to a predetermined date/time (time limit), rather than to a period from the time at which the document recipient gives an instruction to transmit or the time at which the first image forming apparatus 10 transmits document data or other data to the server apparatus 30. In such a case, the charge processor 33 may charge the document sender if such data is output by the predetermined date/time (time limit).

The charge processor 33 may also charge the document sender for the cost of consumables (such as a toner cartridge) incurred for the output (printing) performed on the second image forming apparatus 20.

The system 1 may, in return for the printing cost, give points to the document recipient or allow exchange for other items.

It is assumed that the document recipient makes the second image forming apparatus 20 ready for use in advance. Specifically, this involves registering the document recipient for the second image forming apparatus 20 in advance. Further, information indicating that the document recipient is a person allowed to use the second image forming apparatus 20 is registered into the server apparatus 30 in advance. The document recipient may become able to use the second image forming apparatus 20 upon login to the second image forming apparatus 20, and if a notification indicating the presence of a document to be transmitted to the document recipient arrives from the server apparatus 30, the notification may be displayed on the display 107 to inform the document recipient to that effect.

First Modification of Charging Process

A first modification of the charging process assumes transmission of a direct mail, and differs from the charging process according to the first exemplary embodiment mentioned above in that the charging process charges the transmission cost to the document sender upon receipt of a transmitting request, and further, the charging process additionally charges the document sender if the document recipient actually performs output.

Hereinafter, differences from the system 1 according to the first exemplary embodiment will be described.

Figure 9:
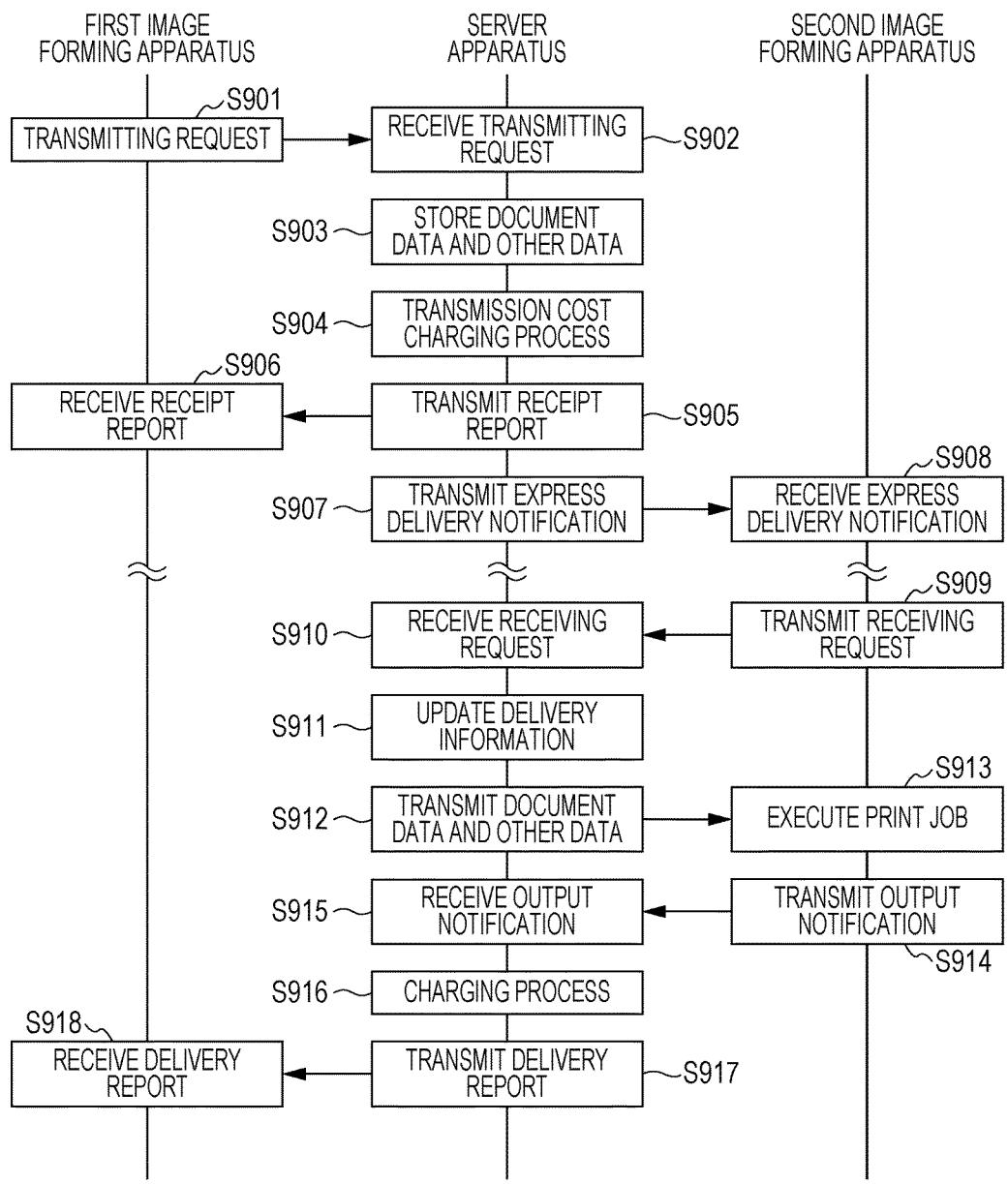
FIG. 9 is a sequence diagram illustrating an example of operation according to a first modification of a charging process.

FIG. 9 is a sequence diagram illustrating an example of operation according to a first modification of the charging process. FIG. 9 illustrates an example of operation when the document sender sends, via the first image forming apparatus 10, a direct mail to the document recipient who uses the second image forming apparatus 20.

In response to an instruction to transmit given from the document sender, the first image forming apparatus 10 makes a transmitting request by transmitting, to the server apparatus 30, document data and transmitting-request information that are to be transmitted to the second image forming apparatus 20 (S901).

The server apparatus 30 receives the transmitting request transmitted from the first image forming apparatus 10 (S902), and then stores the received document data and delivery information (S903). Then, the server apparatus 30 performs a transmission cost charging process (S904). Thereafter, the server apparatus 30 transmits, to the first image forming apparatus 10, a receipt report indicating that the transmitting request has been received (S905). The first image forming apparatus 10 receives the receipt report (S906).

The server apparatus 30 provides a notification to the second image forming apparatus 20 that the server apparatus 30 stores the document data of the express delivery document to be transmitted (S907). The second image forming apparatus 20 receives the notification from the server apparatus 30 (S908). The second image forming apparatus 20 informs the document recipient that a document has been sent.

In response to a receiving request from the document recipient, the second image forming apparatus 20 transmits a receiving request to the server apparatus 30 (S909). Then, the server apparatus 30 receives the receiving request (S910), and updates delivery information (S911). At this time, the server apparatus 30 stores, as part of delivery information, information indicating that a receiving request has been made. Thereafter, the server apparatus 30 transmits, to the second image forming apparatus 20, the document data and the delivery information received from the first image forming apparatus 10 (S912).

The second image forming apparatus 20 executes a print job (S913). That is, the second image forming apparatus 20 forms (prints) an image of the document data on a recording medium. Then, the second image forming apparatus 20 transmits, to the server apparatus 30, a notification (output notification) indicating that an image has been formed (printed) and output, together with output information (S914).

The server apparatus 30 receives the output notification from the second image forming apparatus 20 (S915), and performs an additional-cost charging process (S916). Then, the server apparatus 30 transmits, to the first image forming apparatus 10, a delivery report indicating that the document has been sent (S917), and the first image forming apparatus 10 receives the delivery report (S918).

Transmitting-Request Receiving Process Performed by Server Apparatus 30

Figure 10:
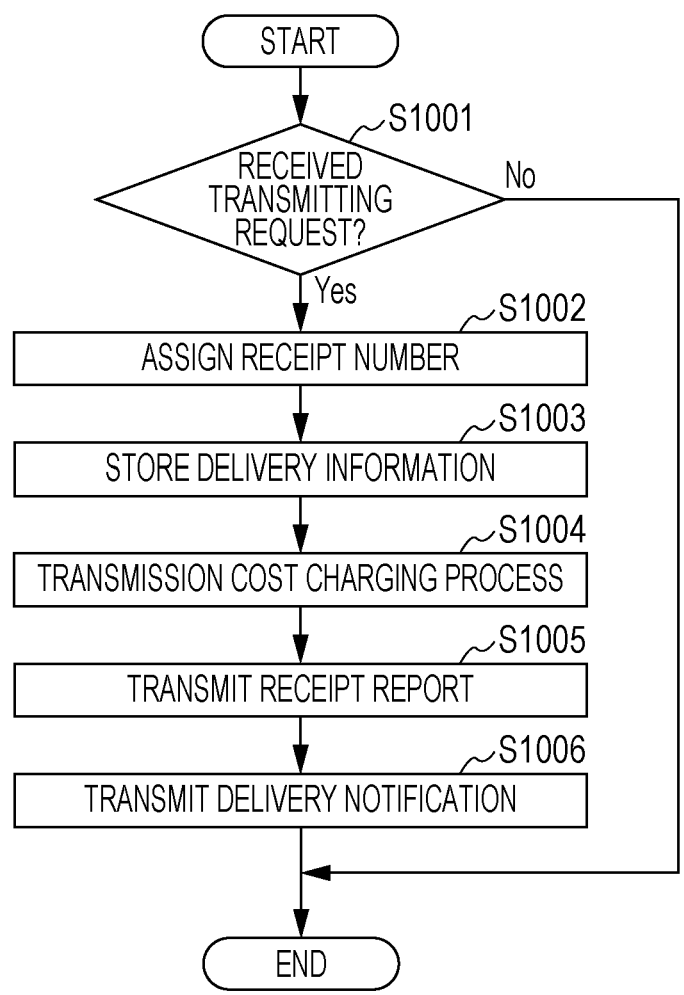
FIG. 10 is a flowchart illustrating a transmitting-request receiving process performed by the server apparatus.

FIG. 10 is a flowchart illustrating a transmitting-request receiving process performed by the server apparatus 30.

The server apparatus 30 repeatedly executes the transmitting-request receiving process every predetermined interval of time (e.g., 10 milliseconds).

The server apparatus 30 determines whether a transmitting request has been received from the first image forming apparatus 10 (S1001). If a transmitting request has been received (Yes at S1001), the server apparatus 30 assigns a receipt number (S1002). The server apparatus 30 then stores delivery information (S1003). Thereafter, the server apparatus 30 performs a transmission-cost charging process (S1004). Then, the server apparatus 30 transmits a receipt report to the first image forming apparatus 10 (S1005). Further, the server apparatus 30 transmits, to the second image forming apparatus 20, a delivery notification indicating that the server apparatus 30 stores the document data to be transmitted and is ready to transmit the document data to the second image forming apparatus 20 (S1006).

Receiving-Request Receiving Process Performed by Server Apparatus 30

Figure 11:
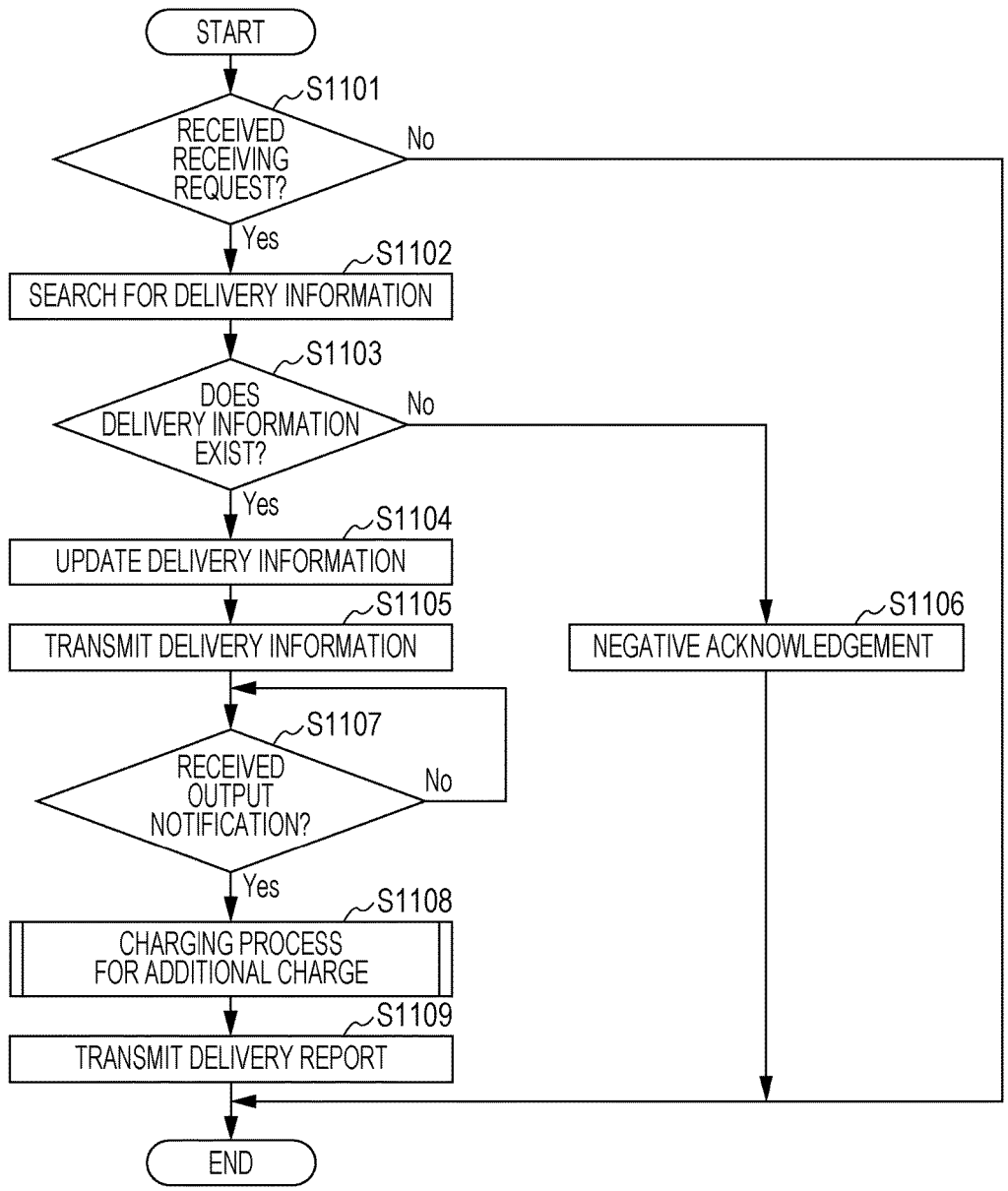
FIG. 11 is a flowchart illustrating a receiving-request receiving process performed by the server apparatus.

FIG. 11 is a flowchart illustrating a receiving-request receiving process performed by a server apparatus.

The server apparatus 30 repeatedly executes the receiving-request receiving process every predetermined interval of time (e.g., 10 milliseconds).

The server apparatus 30 determines whether a receiving request has been received (S1101). If a receiving request has been received (Yes at S1101), the server apparatus 30 searches for delivery information (S1102) to determine whether delivery information exists (S1103). If delivery information exists (Yes at S1103), the server apparatus 30 updates the delivery information (S1104), and transmits the delivery information together with the document data for which the receiving request has been made (S1105). If delivery information does not exist (No at S1103), the server apparatus 30 provides a negative acknowledgement indicating that the document data for which the receiving request has been made does not exist (S1106).

After transmitting, at S1105, the delivery information together with the document data for which the receiving request has been made, the server apparatus 30 determines whether an output notification has been received (S1107). If an output notification has been received (Yes at S1107), the server apparatus 30 performs a charging process for an additional charge (S1108). Thereafter, the server apparatus 30 transmits a delivery report to the first image forming apparatus 10 (S1109).

Alternatively, in the first modification of the charging process, the server apparatus 30 may charge the transmission cost to the document sender upon receiving a transmitting request, and if the document recipient actually performs output within a predetermined period, the server apparatus 30 may further additionally charge the document sender.

Second Modification of Charging Process

A characteristic feature of a second modification of the charging process resides in that if, with the arrangement according to the first modification of the charging process, the document recipient does not perform output within a predetermined period, a portion of the amount charged to the document sender is refunded. For example, if the document recipient performs output within a predetermined period, the document sender is additionally charged, and if the document recipient does not output document data within a predetermined period, a portion of the amount charged to the document sender is refunded.

Figure 12:
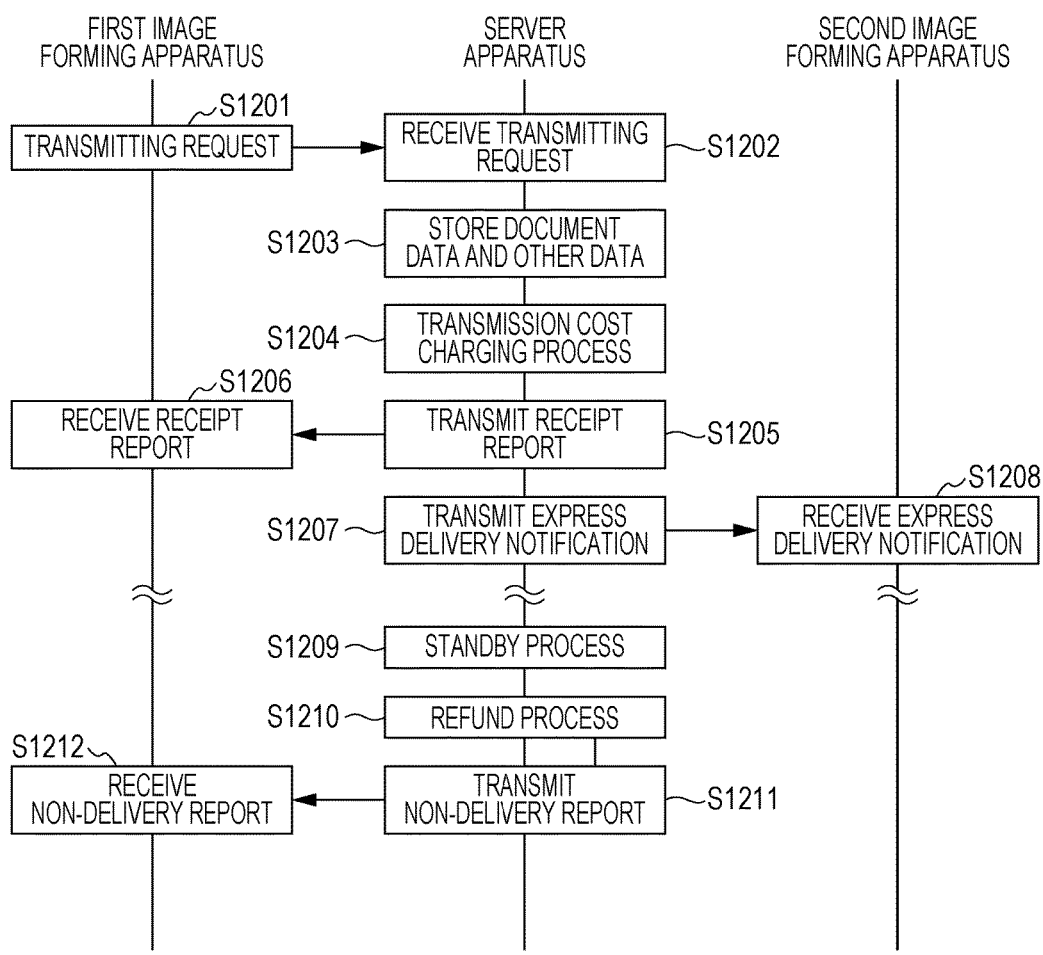
FIG. 12 is a sequence diagram illustrating an example of operation according to a second modification of the charging process.

FIG. 12 is a sequence diagram illustrating an example of operation according to a second modification of the charging process. FIG. 12 illustrates an example of operation when the document sender sends, via the first image forming apparatus 10, a direct mail to the document recipient who uses the second image forming apparatus 20. FIG. 12 is a sequence diagram illustrating an example of operation when the document recipient does not output document data within a predetermined period.

Steps S1201 to S1208 are respectively the same as steps S901 to S908, and hence a description will not be given of these steps.

At S1207, after the server apparatus 30 notifies the second image forming apparatus 20 that the server apparatus 30 stores the document to be transmitted, the server apparatus 30 performs a standby process in which the server apparatus 30 waits for a predetermined period until the server apparatus 30 receives a receiving request from the second image forming apparatus 20 (S1209). If the server apparatus 30 determines during this standby process that a predetermined period has been exceeded for the document in question, the server apparatus 30 performs a refund process that refunds a portion of the amount charged at S1204 (S1210). Then, the server apparatus 30 transmits, to the first image forming apparatus 10, a non-delivery report indicating that the document has not been sent within the predetermined period (S1211), and the first image forming apparatus 10 receives the non-delivery report (S1212).

Standby Process Performed by Server Apparatus 30

Figure 13:
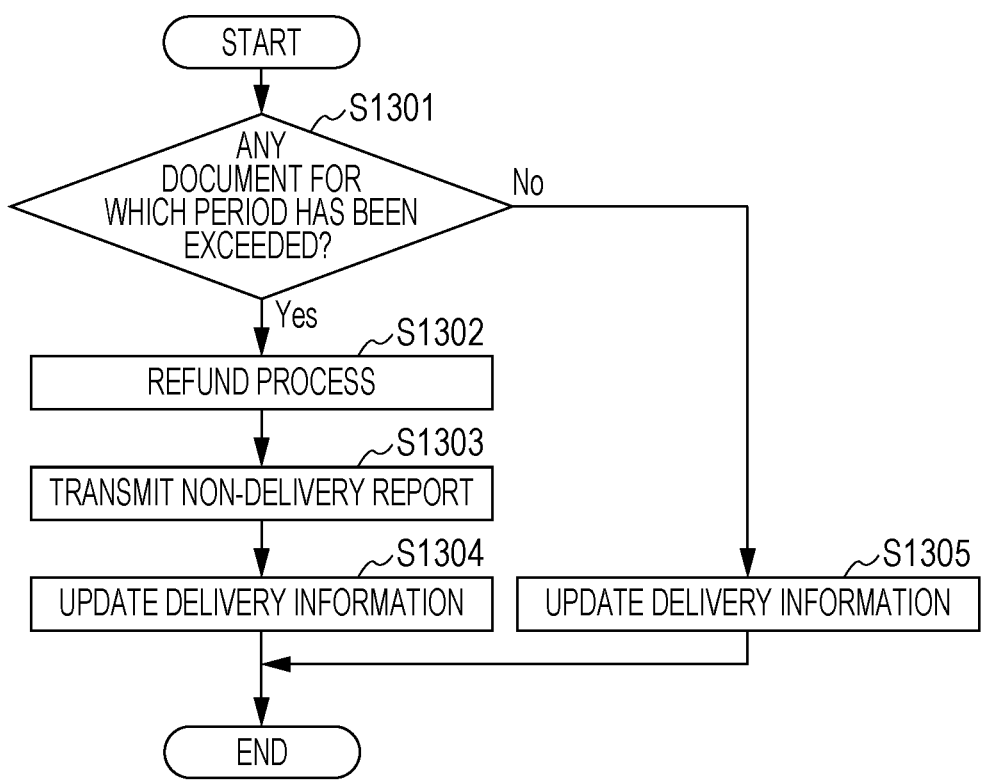
FIG. 13 is a flowchart illustrating a standby process performed by the server apparatus.

FIG. 13 is a flowchart illustrating a standby process performed by the server apparatus 30.

The server apparatus 30 repeatedly executes the standby process every predetermined interval of time (e.g., 10 milliseconds).

The server apparatus 30 determines, based on delivery information, whether there is any document for which a predetermined period has been exceeded (S1301). If there is a document for which a predetermined period has been exceeded (Yes at S1301), the server apparatus 30 refunds a portion of the amount charged at S1203 (S1302). Then, the server apparatus 30 transmits a non-delivery report to the first image forming apparatus 10 (S1303). Further, the server apparatus 30 updates delivery information of documents for which a predetermined period has not been exceeded (S1304). If there is no document for which a predetermined period has been exceeded (No at S1301), the server apparatus 30 updates delivery information for documents for which a predetermined period is determined to have not been exceeded (S1305), and ends the execution of this process.

The server apparatus 30 may, after transmitting a non-delivery report, delete information such as document data related to the unsent document.

Third Modification of Charging Process

A characteristic feature of a third modification of the charging process resides in that the charging process charges the document recipient when the document recipient performs printing for the second and subsequent times. This is because if the document recipient performs printing for the second and subsequent times, this is presumably because the document recipient has lost the document printed for the first time by the document recipient.

Figure 14:
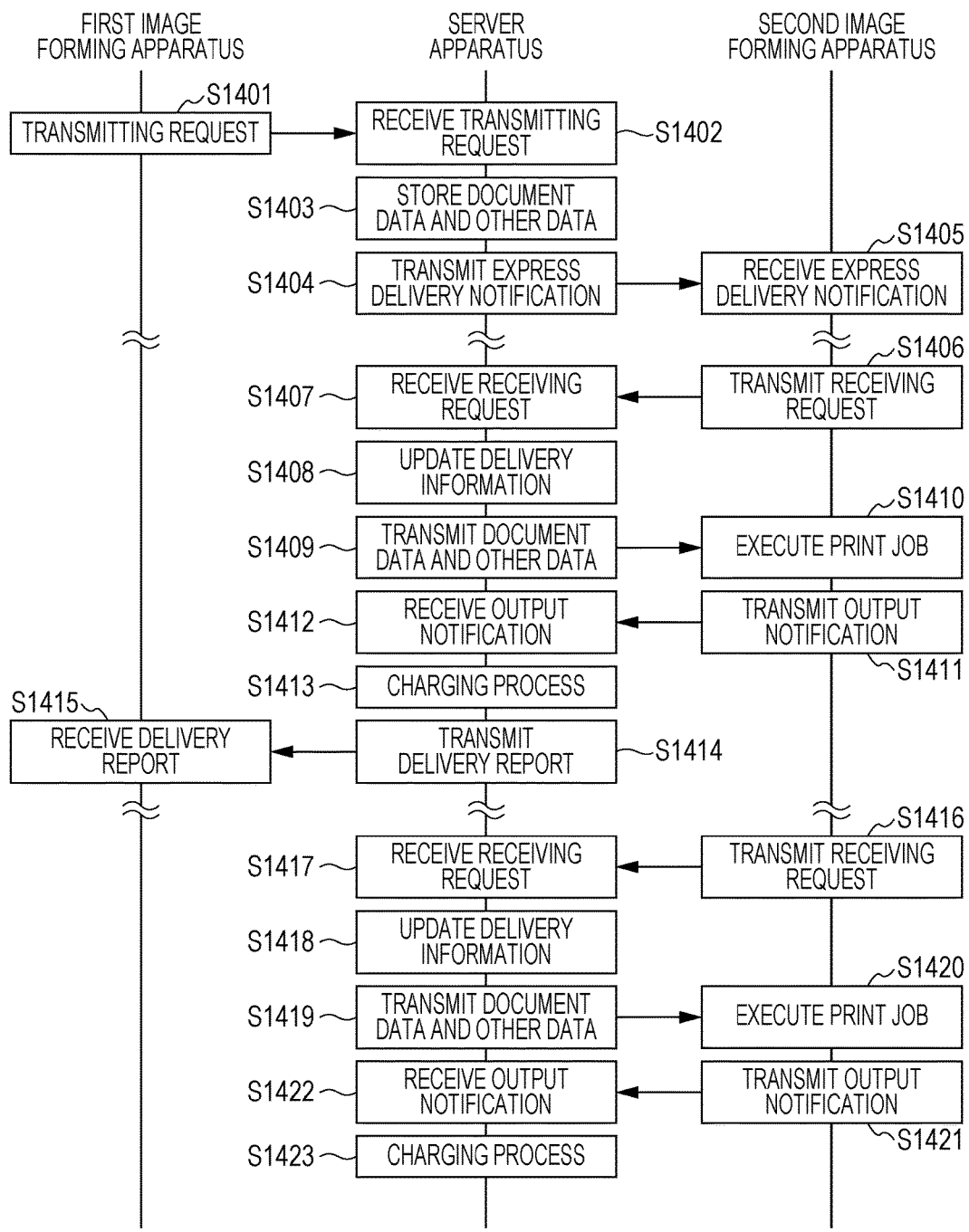
FIG. 14 is a sequence diagram illustrating an example of operation according to a third modification of the charging process.

FIG. 14 is a sequence diagram illustrating an example of operation according to a third modification of the charging process. FIG. 14 illustrates an example of operation when the document sender sends, via the first image forming apparatus 10, a direct mail to the document recipient who uses the second image forming apparatus 20. Further, FIG. 14 is a sequence diagram illustrating an example of operation when the document recipient prints document data twice.

Steps S1401 to S1415 are respectively the same as steps S501 to S515, and hence a description will not be given of these steps.

After the first image forming apparatus 10 receives a delivery report at S1415, the second image forming apparatus 20 transmits a receiving request to the server apparatus 30 in response to a receiving request from the document recipient (S1416). Then, the server apparatus 30 receives the receiving request (S1417), and based on delivery information, searches for the document data for which the receiving request has been made. If the document data for which the receiving request has been made exists, the server apparatus 30 updates the delivery information (S1418). At this time, the server apparatus 30 stores, as part of the delivery information, information indicating that a receiving request has been made. Through the storage of this information, the server apparatus 30 learns that a receiving request has been made multiple times (twice in this sequence) so far for the document data that is currently requested to be received.

Then, the server apparatus 30 transmits the document data and the delivery information to the second image forming apparatus 20 (S1419).

The second image forming apparatus 20 executes a print job (S1420). That is, the second image forming apparatus 20 forms (prints) an image of the document data on a recording medium. Then, the second image forming apparatus 20 transmits, to the server apparatus 30, a notification (output notification) indicating that an image has been formed (printed) and output, together with output information (S1421).

The server apparatus 30 receives the output notification from the second image forming apparatus 20 (S1422). Since document data is printed for the second time in this case, the server apparatus 30 performs a charging process in which the server apparatus 30 charges the document recipient (S1423).

Transmitting-Request Receiving Process Performed by Server Apparatus 30

Figure 15:
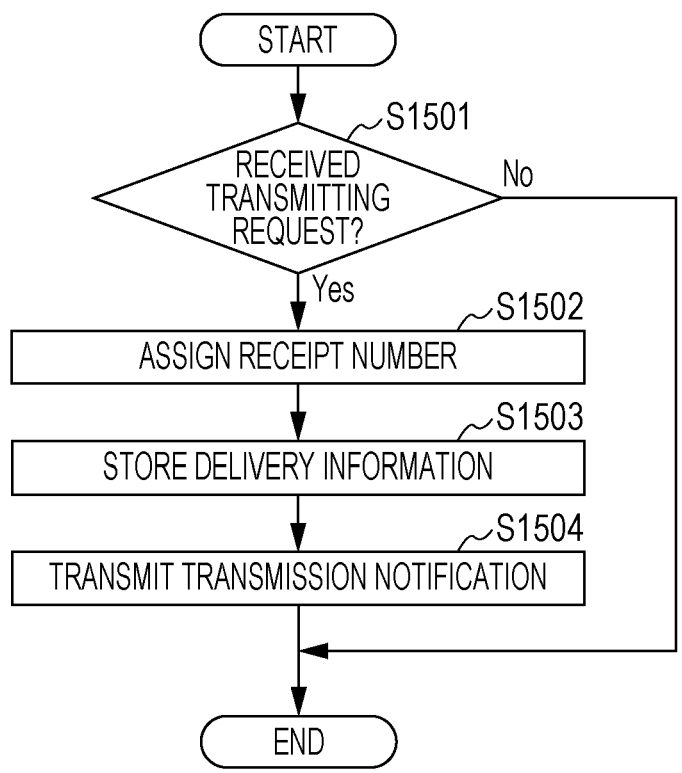
FIG. 15 is a flowchart illustrating a transmitting-request receiving process performed by the server apparatus.

FIG. 15 is a flowchart illustrating a transmitting-request receiving process performed by the server apparatus 30.

The server apparatus 30 repeatedly executes the transmitting-request receiving process every predetermined interval of time (e.g., 10 milliseconds).

The server apparatus 30 determines whether a transmitting request has been received from the first image forming apparatus 10 (S1501). If a transmitting request has been received (Yes at S1501), the server apparatus 30 assigns a receipt number (S1502). The server apparatus 30 then stores delivery information (S1503). Thereafter, the server apparatus 30 transmits, to the second image forming apparatus 20, a transmission notification indicating that a document has been transmitted (S1504).

Receiving-Request Receiving Process Performed by Server Apparatus 30

Figure 16:
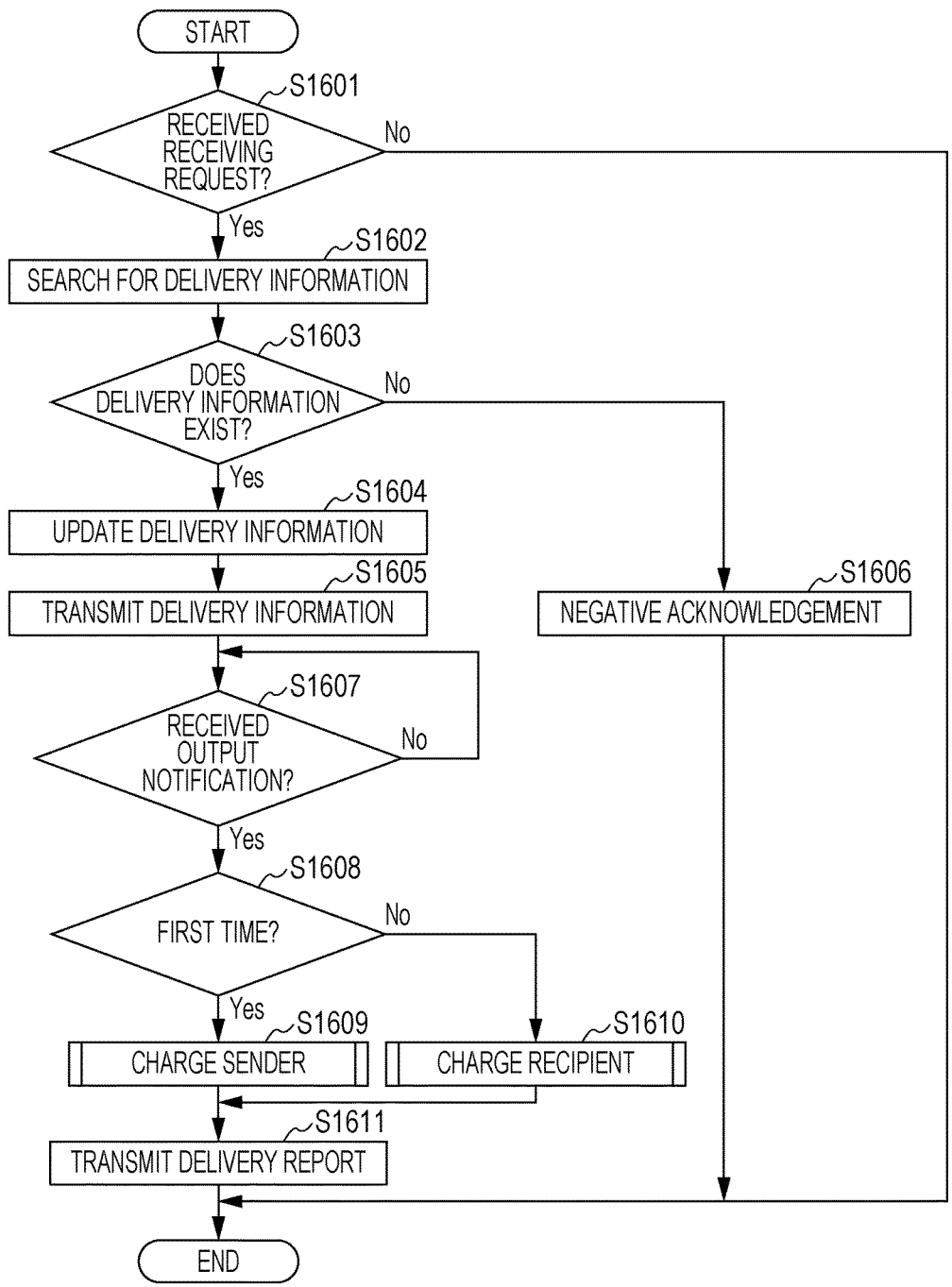
FIG. 16 is a flowchart illustrating a receiving-request receiving process performed by the server apparatus.

FIG. 16 is a flowchart illustrating a receiving-request receiving process performed by the server apparatus 30.

The server apparatus 30 repeatedly executes the receiving-request receiving process every predetermined interval of time (e.g., 10 milliseconds).

The server apparatus 30 determines whether a receiving request has been received (S1601). If a receiving request has been received (Yes at S1601), the server apparatus 30 searches for delivery information (S1602) to determine whether delivery information exists (S1603). If delivery information exists (Yes at S1603), the server apparatus 30 stores information indicating that a receiving request has been received, and updates the delivery information (S1604). In updating the delivery information at this time, the number of times a receiving request has been received, in other words, the number of times output has been performed is stored. After updating the delivery information, the server apparatus 30 transmits the delivery information together with the document data for which the receiving request has been made (S1605).

If delivery information does not exist (No at S1603), the server apparatus 30 provides a negative acknowledgement indicating that the document data for which the receiving request has been made does not exist (S1606).

After transmitting, at S1605, the delivery information together with the document data for which the receiving request has been made, the server apparatus 30 determines whether an output notification has been received (S1607). If an output notification has been received (Yes at S1607), the server apparatus 30 determines whether the current output operation is the first output (receiving request) performed (S1608). If the current output operation is the first output (receiving request) performed (Yes at S1608), the server apparatus 30 performs a charging process in which the server apparatus 30 charges the document sender (S1609), and if the current output operation is not the first output performed (No at S1608), the server apparatus 30 performs a charging process in which the server apparatus 30 charges the document recipient (S1610).

After performing, at S1609, the charging process in which the server apparatus 30 charges the document sender, the server apparatus 30 transmits a delivery report to the first image forming apparatus 10 (S1611).

The third modification of the charging process may employ the following configuration similarly as mentioned above. That is, the charging process allows the document sender to enter an output time limit when instructing that a document be transmitted, determines whether the date/time of output at the document recipient meets this time limit, and changes the amount charged depending on the result of this determination.

If the document sender sets an express delivery flag or time limit when instructing that a document be transmitted, the server apparatus 30 may notify the document recipient to that effect. The server apparatus 30 may provide the above-mentioned notification to the document recipient via, for example, an e-mail.

If the document recipient is not an individual but is, for example, a specific organization (department) within a company, the second image forming apparatus 20 (image output device) located within the specific organization (department) may inform a person belonging to the specific organization (department) by means of, for example, flashing of a lamp or sound.

In such a case, the second image forming apparatus 20 may determine whether the document recipient is an individual or organization (department), and change the informing method depending on the result of this determination.

The third modification of the charging process may employ the following configuration, for example. That is, the transmission cost is charged to the document sender upon receipt of a transmitting request. Further, if the document recipient performs output (printing) for the first time within a predetermined period, the document sender is additionally charged, and if the document recipient subsequently performs output for the second time, the document recipient is charged.

The system 1 described above may be modified such that for the second and subsequent outputs only, the document recipient is allowed to change output (print) parameters (such as whether to enlarged or reduce, whether to fit multiple pages on a single sheet (whether to perform N-up printing), whether to print on one side or both sides, and whether to print monochrome or color).

The system 1 described above may be modified to include, instead of the first image forming apparatus 10, a terminal apparatus that performs operations such as receiving information input by the user (e.g., the document sender), and outputting information to the user. In that case, FIG. 3 may be understood as a block diagram illustrating the hardware configuration of the terminal apparatus. That is, the terminal apparatus includes the CPU 301, the internal memory 302, the HDD 303, the communication I/F 304, the display mechanism 305, and the input device 306.

Second Exemplary Embodiment

A system 2 according to a second exemplary embodiment differs from the system 1 according to the first exemplary embodiment in that the system 2 does not include the server apparatus 30.

The first image forming apparatus 10 and the second image forming apparatus 20 are capable of communicating with each other via the communication line 40.

Hereinafter, differences from the system 1 according to the first exemplary embodiment will be described.

With the system 2 according to the second exemplary embodiment, the first image forming apparatus 10 at the transmitting end performs a charging process.

Figure 17:
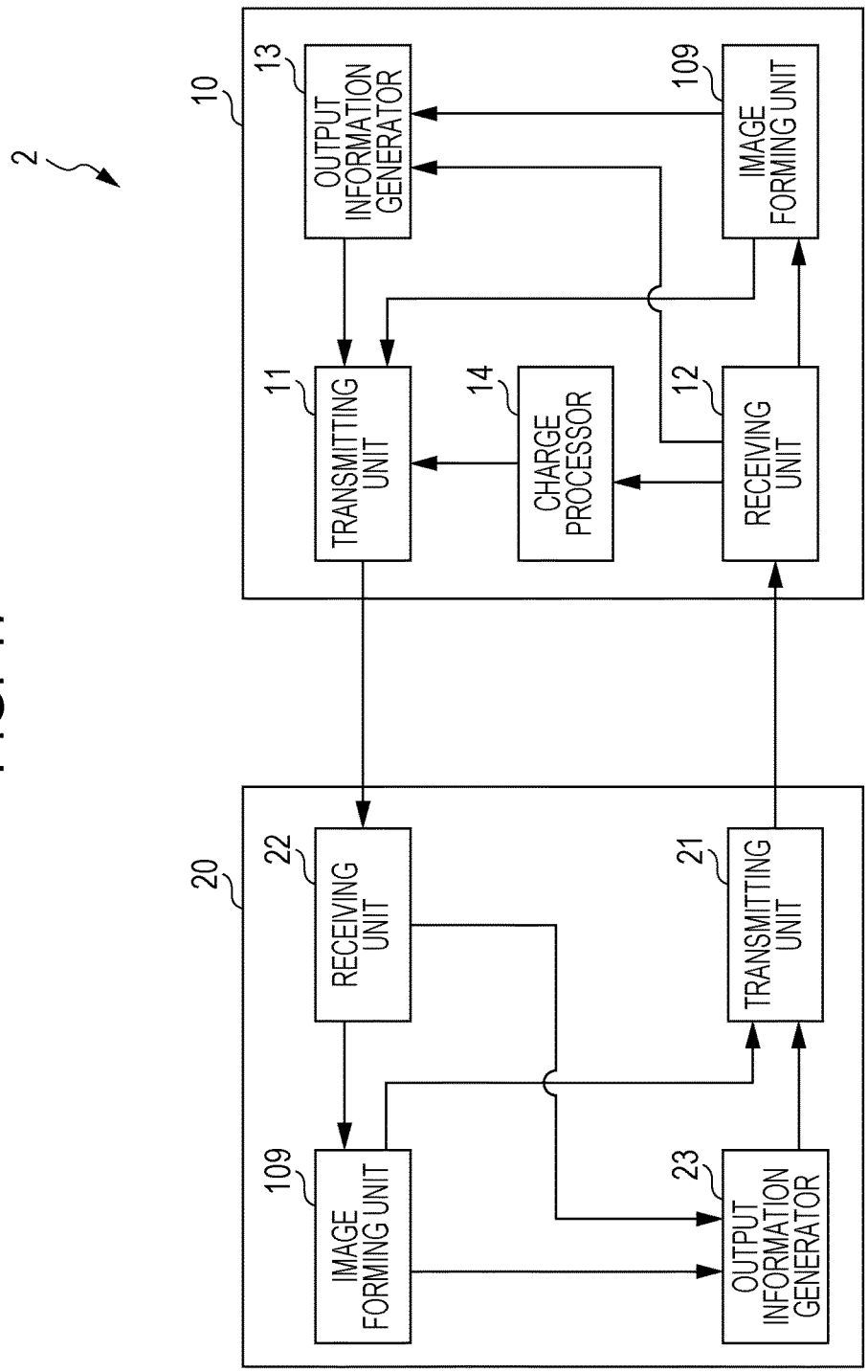
FIG. 17 is a block diagram illustrating the functional configuration of a system according to a second exemplary embodiment.

FIG. 17 is a block diagram illustrating the functional configuration of the system 2 according to the second exemplary embodiment of the present invention.

The first image forming apparatus 10 further includes a charge processor 14, in addition to the transmitting unit 11, the receiving unit 12, and the output information generator 13. The charge processor 14 has the same function as that of the charge processor 33 of the server apparatus 30 of the system 1 according to the first exemplary embodiment.

The system 2 according to the second exemplary embodiment is a system including the first image forming apparatus 10, which is an example of a first processing apparatus that transmits data, and the second image forming apparatus 20, which is an example of a second processing apparatus that receives and outputs the transmitted data. The first image forming apparatus 10 includes the charge processor 14, which is an example of a charge section that, if the second image forming apparatus 20 outputs the data within a predetermined period after the time at which the data is transmitted, charges the sender higher than if the second image forming apparatus 20 outputs the data past the predetermined period.

Figure 18:
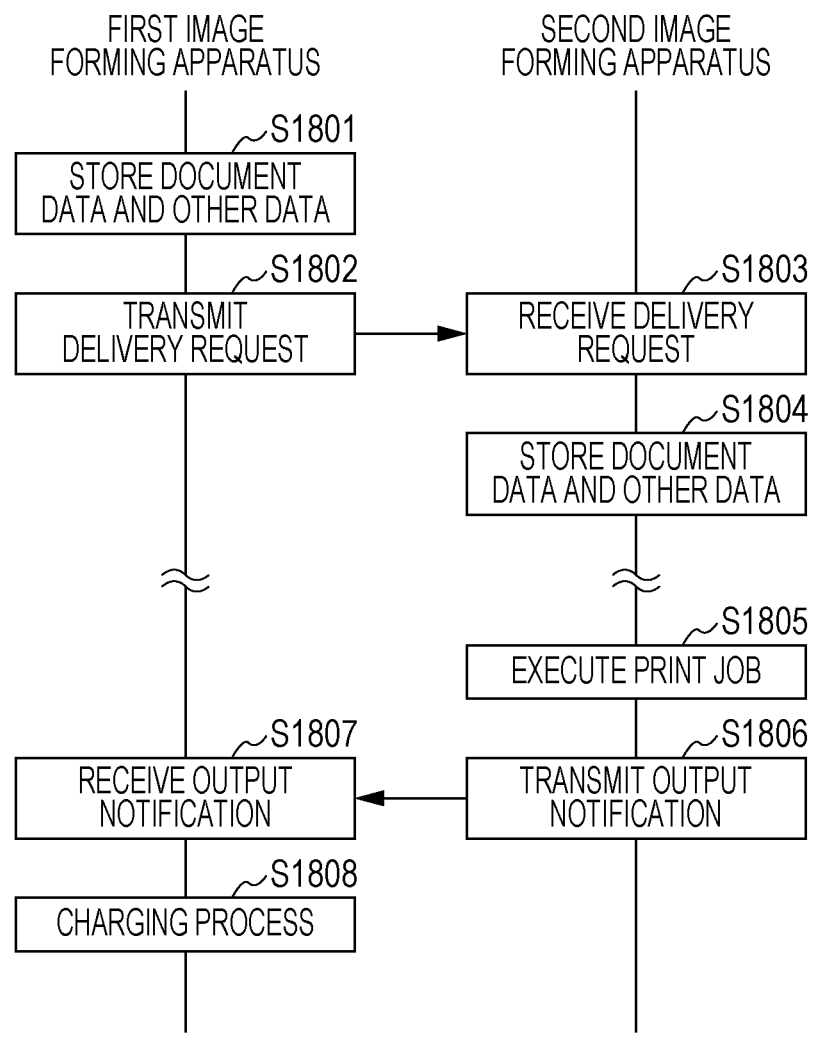
FIG. 18 is a sequence diagram illustrating an example of operation in the system according to the second exemplary embodiment.

FIG. 18 is a sequence diagram illustrating an example of operation in the system 2 according to the second exemplary embodiment. FIG. 18 illustrates an example of operation when the document sender sends, via the first image forming apparatus 10, an express delivery document to the document recipient who uses the second image forming apparatus 20.

In response to an instruction to transmit given from the document sender, the first image forming apparatus 10 stores document data and delivery information (S1801), and makes a delivery request by transmitting the document data and the delivery information to the second image forming apparatus 20 (S1802).

The second image forming apparatus 20 receives the delivery request from the first image forming apparatus 10 (S1803), and stores the document data and the delivery information (S1804). The second image forming apparatus 20 also informs the document recipient that a document has been sent.

The second image forming apparatus 20 executes a print job in response to an instruction to print given from the document recipient (S1805). That is, the second image forming apparatus 20 forms (prints) an image of the document data on a recording medium. Then, the second image forming apparatus 20 transmits, to the first image forming apparatus 10, a notification (output notification) indicating that an image has been formed (printed) and output, together with output information (S1806).

The first image forming apparatus 10 receives the output notification from the second image forming apparatus 20 (S1807), and performs a charging process (S1808).

Transmitting-Request Receiving Process Performed By First Image Forming Apparatus 10

Figure 19:
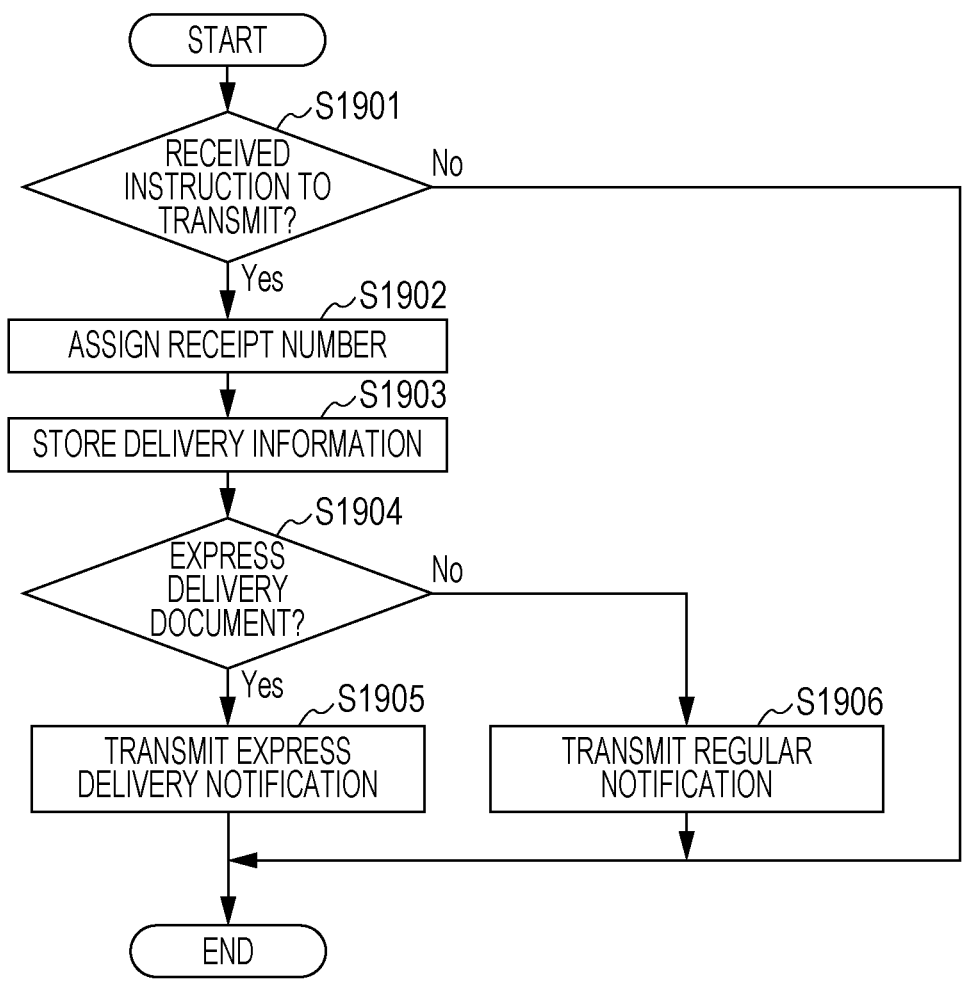
FIG. 19 is a flowchart illustrating a transmitting-request receiving process performed by the first image forming apparatus.

FIG. 19 is a flowchart illustrating a transmitting-request receiving process performed by the first image forming apparatus 10.

The first image forming apparatus 10 repeatedly executes the transmitting-request receiving process every predetermined interval of time (e.g., 10 milliseconds).

The first image forming apparatus 10 determines whether an instruction to transmit has been received from the document sender (S1901). If a transmitting request has been received (Yes at S1901), the first image forming apparatus 10 assigns a receipt number (S1902). The first image forming apparatus 10 then stores delivery information (S1903). Thereafter, the first image forming apparatus 10 determines whether the document for which the instruction to transmit has been received is an express delivery document (S1904). If the document is an express delivery document (Yes at S1904), the first image forming apparatus 10 transmits, to the second image forming apparatus 20, an express delivery notification indicating that an express delivery document has been transmitted (S1905). If the document is not an express delivery document (No at S1904), the first image forming apparatus 10 transmits, to the second image forming apparatus 20, a regular notification indicating that a regular document, which is not an express delivery document, has been transmitted (S1906).

Charging Process Performed by First Image Forming Apparatus 10

Figure 20:
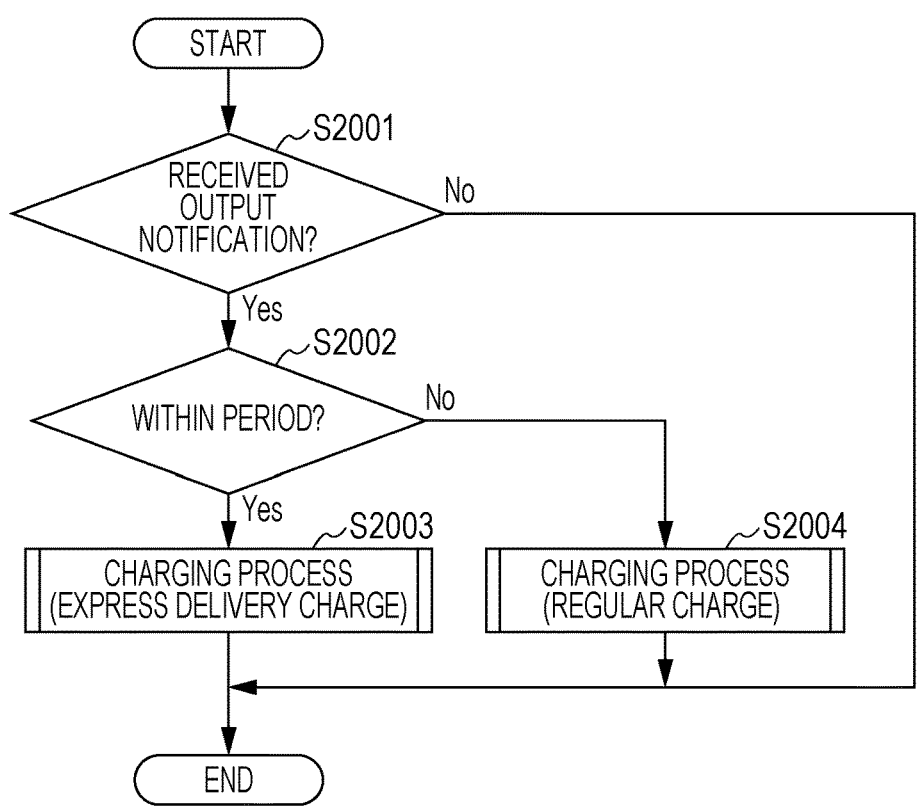
FIG. 20 is a flowchart illustrating a charging process performed by the first image forming apparatus.

FIG. 20 is a flowchart illustrating a charging process performed by the first image forming apparatus 10.

The first image forming apparatus 10 repeatedly executes the charging process every predetermined interval of time (e.g., 10 milliseconds).

The first image forming apparatus 10 determines whether an output notification has been received from the second image forming apparatus 20 (S2001). If an output notification has been received (Yes at S2001), the first image forming apparatus 10 determines whether the current time is within a predetermined period (S2002). Then, if the current time is within a predetermined period (Yes at S2002), the first image forming apparatus 10 performs a charging process based on an express delivery charge (S2003), and if the current time is not within a predetermined period (No at S2002), the first image forming apparatus 10 performs a charging process based on a regular charge (S2004).

Third Exemplary Embodiment

A system 3 according to a third exemplary embodiment differs from the system 2 according to the second exemplary embodiment in that the second image forming apparatus 20 at the receiving end performs a charging process.

Hereinafter, differences from the system 1 according to the first exemplary embodiment will be described.

Figure 21:
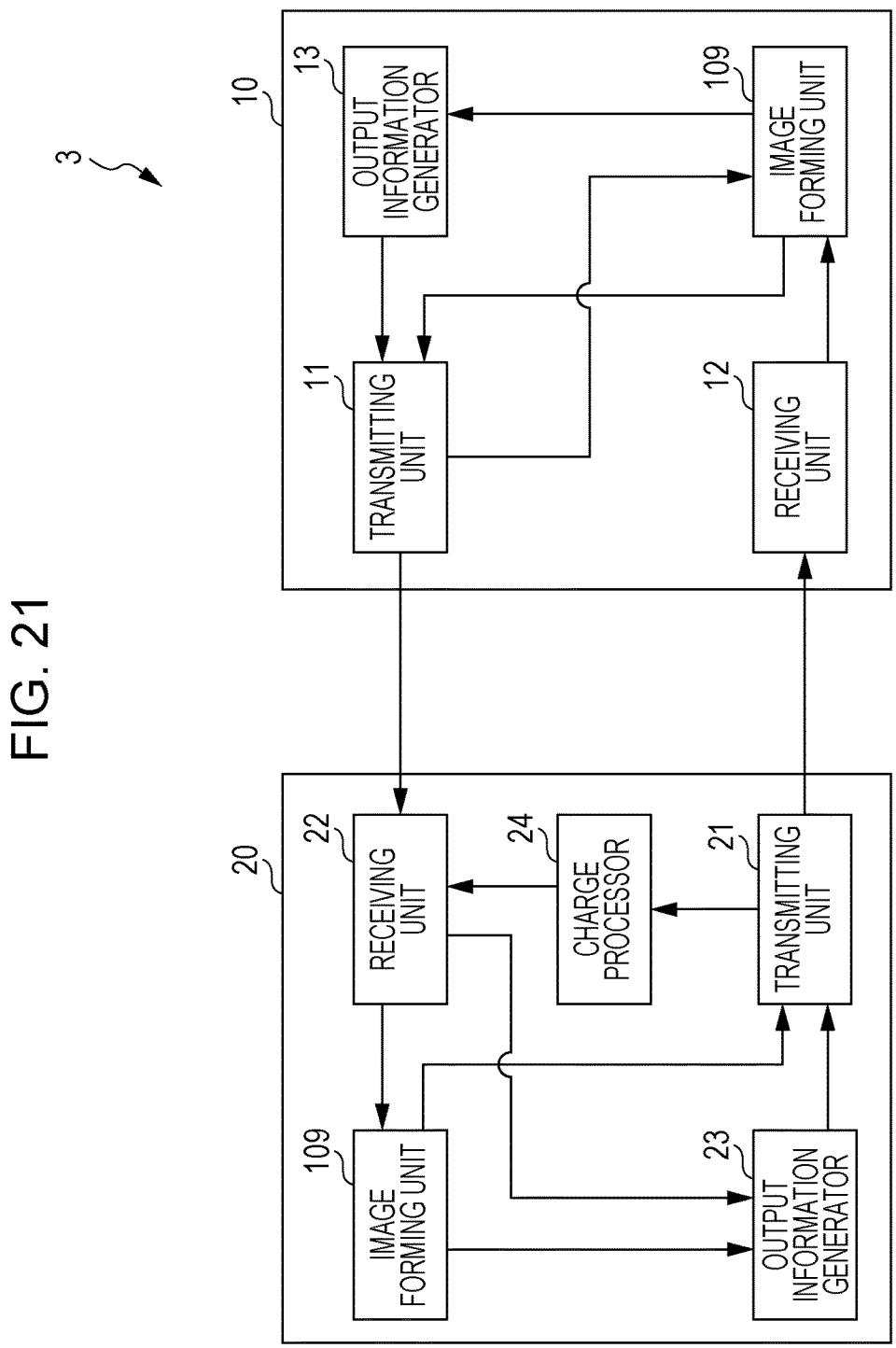
FIG. 21 is a block diagram illustrating the functional configuration of a system according to a third exemplary embodiment.

FIG. 21 is a block diagram illustrating the functional configuration of the system 3 according to the third exemplary embodiment of the present invention.

The second image forming apparatus 20 further includes a charge processor 24, in addition to the transmitting unit 21, the receiving unit 22, and the output information generator 23. The charge processor 24 has the same function as that of the charge processor 33 of the server apparatus 30 of the system 1 according to the first exemplary embodiment.

The second image forming apparatus 20 is a processing apparatus including the receiving unit 22, which is an example of a receiving section that receives data transmitted by a sender, the transmitting unit 21, which is an example of an output section that outputs the data received by the receiving unit 22, and the charge processor 24, which is an example of a charge section that charges the sender if the transmitting unit 21 outputs the data within a predetermined period after the time at which the data is transmitted.

Figure 22:
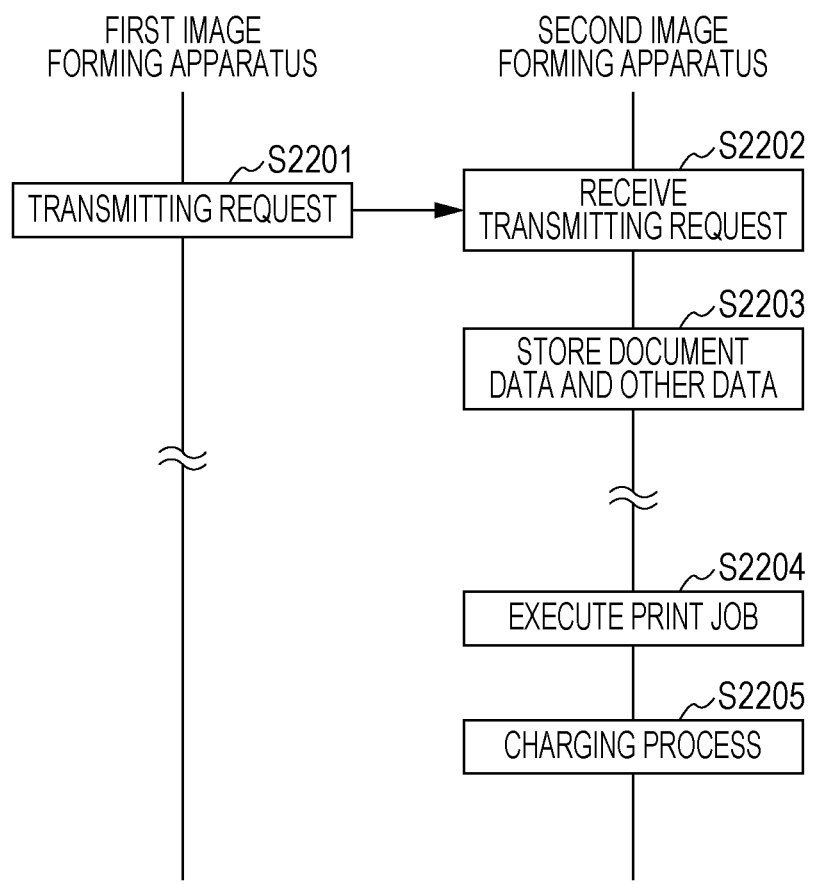
FIG. 22 is a sequence diagram illustrating an example of operation in the system according to the third exemplary embodiment.

FIG. 22 is a sequence diagram illustrating an example of operation in the system 3 according to the third exemplary embodiment. FIG. 22 illustrates an example of operation when the document sender sends, via the first image forming apparatus 10, an express delivery document to the document recipient who uses the second image forming apparatus 20.

Upon receiving an instruction to transmit given from the document sender, the first image forming apparatus 10 makes a transmitting request by transmitting document data and delivery information to the second image forming apparatus 20 (S2201).

The second image forming apparatus 20 receives the transmitting request from the first image forming apparatus 10 (S2202), and stores the document data and the delivery information (S2203). That is, after receiving the transmitting request, the second image forming apparatus 20 assigns a receipt number, and stores the delivery information. The second image forming apparatus 20 also informs the document recipient that a document has been sent.

The second image forming apparatus 20 executes a print job in response to an instruction to print given from the document recipient (S2204). That is, the second image forming apparatus 20 forms (prints) an image of the document data on a recording medium. Thereafter, the second image forming apparatus 20 performs a charging process (S2205).

Charging Process Performed by Second Image Forming Apparatus 20

Figure 23:
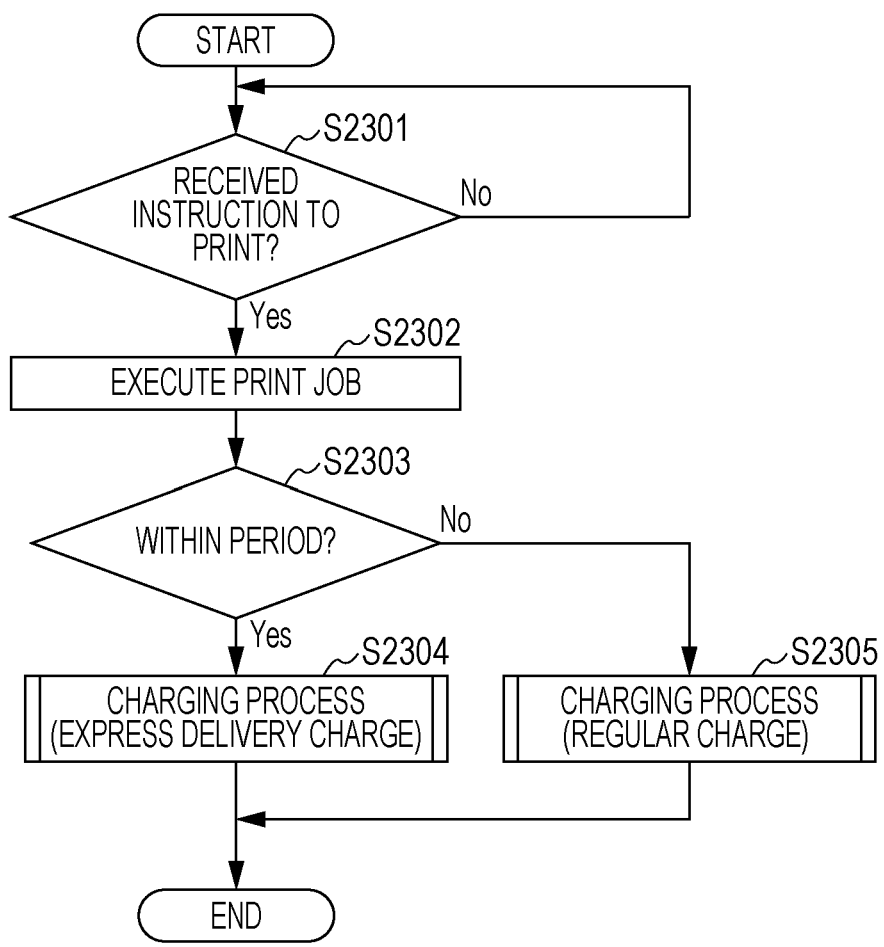
FIG. 23 is a flowchart illustrating a charging process performed by the second image forming apparatus.

FIG. 23 is a flowchart illustrating a charging process performed by the second image forming apparatus 20.

The second image forming apparatus 20 repeatedly executes the charging process every predetermined interval of time (e.g., 10 milliseconds).

The second image forming apparatus 20 determines whether an instruction to print has been received from the document sender (S2301). If an instruction to print has been received (Yes at S2301), the second image forming apparatus 20 executes a print job (S2302). Then, the second image forming apparatus 20 determines whether the current time is within a predetermined period (S2303). Then, if the current time is within a predetermined period (Yes at S2303), the second image forming apparatus 20 performs a charging process based on an express delivery charge (S2304), and if the current time is not within a predetermined period (No at S2303), the second image forming apparatus 20 performs a charging process based on a regular charge (S2305).

In the system 3 according to the third exemplary embodiment, multiple functions included in the second image forming apparatus 20 at the receiving end may be implemented by multiple devices. For example, devices such as a device that implements the function of the charge processor 24, and another device that implements the function of storing information such as document data and delivery information may form a cluster to allow these functions to be shared in a distributed manner. The function of the charge processor 24 and the function of storing delivery information may be implemented by the same device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing apparatus comprising:
a processor programmed to:
receive data transmitted by a sender;
output the data at a destination so as to complete a process requested by the sender;
determine whether the data is outputted at the destination within a predetermined period from a time at which the data is transmitted by the sender; and
after the data is outputted at the destination,
charge the sender if the determination indicates that the data is outputted at the destination within the predetermined period from the time at which the data is transmitted by the sender, and
regardless of a type of request made by the sender, not charge the sender if the determination indicates that the data is not outputted at the destination within the predetermined period from the time at which the data is transmitted by the sender.

2. The processing apparatus according to claim 1, wherein the processor is programmed to:
if the data is outputted within the predetermined period, charge the sender higher than if the data is outputted past the predetermined period.

3. The processing apparatus according to claim 1, wherein the processor is programmed to:
if the data is outputted a plurality of times, charge a person who requests the data to be outputted instead of the sender when the data is outputted for second and subsequent times.

4. The processing apparatus according to claim 1, wherein the processor is programmed to output the data by printing the data.

5. A processing apparatus comprising:
a processor programmed to:
receive data transmitted by a sender;
output the data at a destination so as to complete a process requested by the sender;
determine whether the data is outputted at the destination within a predetermined period from a time at which the data is transmitted by the sender; and
after the data is outputted at the destination,
charge the sender a first amount if the determination indicates that the data is outputted at the destination within the predetermined period from the time at which the data is transmitted by the sender, and
regardless of a type of request made by the sender, charge the sender a second amount lower than the first amount if the determination indicates that the data is not outputted at the destination within the predetermined period from the time at which the data is transmitted by the sender.

6. The processing apparatus according to claim 5, wherein the processor is programmed to output the data by printing the data.

7. A system comprising:
a first processing apparatus that transmits data;
a second processing apparatus that receives and outputs the transmitted data so as to complete a process requested by the first processing apparatus; and a charge apparatus that:
- (i) charges a sender of the data when the data is transmitted by the first processing apparatus;
- (ii) determines whether the second processing apparatus outputs the data within a predetermined period from a time at which the first processing apparatus transmits the data; and
- (iii) after the second processing apparatus outputs the data:
  - additionally charges the sender when the determination indicates that the second processing apparatus outputs the data within the predetermined period from the time at which the first processing apparatus transmits the data, and
  - regardless of a type of request made by the sender, not additionally charge the sender when the determination indicates that the second processing apparatus does not output the data within the predetermined period from the time at which the first processing apparatus transmits the data.

8. The system according to claim 7, wherein the second processing apparatus outputs the transmitted data by printing the transmitted data.

9. A system comprising:
a first processing apparatus that transmits data;
a second processing apparatus that receives and outputs the transmitted data so as to complete a process requested by the first processing apparatus; and
a charge apparatus that:
- (i) charges a sender of the data when the data is transmitted by the first processing apparatus;
- (ii) determines whether the second processing apparatus outputs the data within a predetermined period from a time at which the first processing apparatus transmits the data; and
- (iii) after the second processing apparatus outputs the data:
  - additionally charges the sender when the determination indicates that the second processing apparatus outputs the data within the predetermined period from the time at which the first processing apparatus transmits the data, and
  - regardless of a type of request made by the sender, provide the sender at least a partial refund when the determination indicates that the second processing apparatus does not output the data within the predetermined period from the time at which the first processing apparatus transmits the data.

10. The system according to claim 9, wherein the second processing apparatus outputs the transmitted data by printing the transmitted data.

11. A system comprising:
a first processing apparatus that:
- (i) transmits data;
- (ii) determines whether the data is outputted by a second processing apparatus within a predetermined period from a time at which the data is transmitted by the first processing apparatus; and
- (iii) when the determination indicates that the data is outputted by the second processing apparatus within the predetermined period from the time at which the data is transmitted by the first processing apparatus, charges a sender of the data higher than when the determination indicates that the data is not outputted by the second processing apparatus within the predetermined period from the time at which the data is transmitted by the first processing apparatus; and the second processing apparatus that receives and outputs the transmitted data so as to complete a process requested by the first processing apparatus.

12. The system according to claim 11, wherein the second processing apparatus outputs the transmitted data by printing the transmitted data.

\* \* \* \* \*